(12) United States Patent
Kim et al.

(10) Patent No.: US 11,159,967 B2
(45) Date of Patent: Oct. 26, 2021

(54) APPARATUS AND METHOD FOR MEASUREMENT IN WIRELESS COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/911,193

(22) Filed: Jun. 24, 2020

(65) Prior Publication Data

US 2020/0404521 A1 Dec. 24, 2020

(30) Foreign Application Priority Data

Jun. 24, 2019 (KR) .................. 10-2019-0075114
Jul. 22, 2019 (KR) .................. 10-2019-0088530
May 25, 2020 (KR) .................. 10-2020-0062525

(51) Int. Cl.
*H04W 24/08* (2009.01)
*H04W 24/10* (2009.01)

(52) U.S. Cl.
CPC ............ *H04W 24/08* (2013.01); *H04W 24/10* (2013.01)

(58) Field of Classification Search
None
See application file for complete search history.

(56) References Cited

U.S. PATENT DOCUMENTS 10,448,273 B2 * 10/2019 Yi ..................... H04W 28/0268
10,548,041 B2 * 1/2020 Keskitalo ............... H04B 17/24
(Continued)

FOREIGN PATENT DOCUMENTS

KR 10-2020-0027818 A 3/2020
WO 2020/050575 A1 3/2020

OTHER PUBLICATIONS

"3rd Generation Partnership Project; Technical Specification Group Radio Access Network; NR; Physical layer procedures for data (Release 16)", 3GPP TS 38.214 V16.1.0 (Mar. 2020), 151 pages.
(Continued)

*Primary Examiner* — Adolf Dsouza

(57) ABSTRACT

The present disclosure relates to a pre-$5^{th}$-Generation (5G) or 5G communication system to be provided for supporting higher data rates beyond $4^{th}$-Generation (4G) communication system such as long-term evolution (LTE). The disclosure relates to the collection and reporting of measurement information in a wireless communication system, in which an operation method of a terminal may include receiving configuration information for a logged minimization drive test (MDT) disclosed by a secondary node (SN), storing a measurement result by performing the logged MDT in one of a radio resource control (RRC) idle mode or an RRC inactive mode, based on the received configuration information, transmitting a message including an indicator for indicating that the stored measurement result exists after the terminal is switched to the RRC connected mode, receiving a request message for requesting the logged MDT measurement result, and transmitting a message for reporting the logged MDT measurement result.

12 Claims, 19 Drawing Sheets

(56) References Cited

U.S. PATENT DOCUMENTS

2018/0084451 A1\* 3/2018 Fukuta ................. H04W 24/10
2019/0007855 A1\* 1/2019 Lee ................... H04W 28/0236
2020/0351693 A1\* 11/2020 Jung .................... H04W 24/10

OTHER PUBLICATIONS

"3rd Generation Partnership Project; Technical Specification Group Radio Access Network; NR; Medium Access Control (MAC) protocol specification (Release 16)", 3GPP TS 38.321 V16.0.0 (Mar. 2020), 141 pages.

\* cited by examiner

APPARATUS AND METHOD FOR MEASUREMENT IN WIRELESS COMMUNICATION SYSTEM

CROSS-REFERENCE TO RELATED APPLICATIONS

This application is based on and claims priority under 35 U.S.C. 119 to Korean Patent Application No. 10-2019-0075114 filed on Jun. 24, 2019, Korean Patent Application No. 10-2019-0088530 filed on Jul. 22, 2019, and Korean Patent Application No. 10-2020-0062525 filed on May 25, 2020 in the Korean Intellectual Property Office, the disclosures of which are herein incorporated by reference in their entirety.

BACKGROUND

1. Field

The disclosure relates to an apparatus and a method for measurement in a wireless communication system and, more particularly, to a method and an apparatus for collecting and reporting cell measurement information in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information. The Internet of Everything (IoE), which is a combination of the IoT technology and big data processing technology through connection with a cloud server, has emerged. As technology elements, such as sensing technology, wired/wireless communication and network infrastructure, service interface technology, and security technology have been demanded for IoT implementation, a sensor network, a Machine-to-Machine (M2M) communication, Machine Type Communication (MTC), and so forth have been recently researched. Such an IoT environment may provide intelligent Internet Technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

More variety of services have come to be provided according to the development of a wireless communication system, and methods for effectively providing these services are required. For example, there is a need for a method for random access in a wireless communication system.

The above information is presented as background information only to assist with an understanding of the disclosure. No determination has been made, and no assertion is made, as to whether any of the above might be applicable as prior art with regard to the disclosure.

SUMMARY

The disclosure provides an apparatus and a method for performing measurements in a wireless communication system.

In addition, the disclosure provides an apparatus and a method for performing measurement when a multiple access service is provided to a terminal in a wireless communication system.

In addition, the disclosure provides a method and an apparatus for measuring a cell in a wireless communication system.

In addition, the disclosure provides a method and an apparatus for reporting a cell measurement result in a wireless communication system.

According to various embodiments, an operation method of a terminal in a wireless communication system may include receiving configuration information for a logged minimization drive test (MDT) disclosed by a secondary node (SN), storing a measurement result by performing the logged MDT in one of a radio resource control (RRC) idle mode or an RRC inactive mode, based on the received configuration information, transmitting a message including an indicator for indicating that the stored measurement result exists after the terminal is switched to the RRC connected mode, receiving a request message for requesting the logged MDT measurement result, and transmitting a message for reporting the logged MDT measurement result in response to the request message.

According to various embodiments, an operation method of a terminal in a wireless communication system may include receiving configuration information from a base station, switching to a radio resource control (RRC) inactive mode, measuring a cell for each interval based on the configuration information and storing a measurement result, transmitting a message to switch to an RRC connected mode to the base station, and transmitting an indicator related to the measurement results to the base station.

The apparatus and method according to various embodiments enable efficient collection and reporting of measurement information according to a radio resource control (RRC) state of a terminal in a multiple access state, and enable efficient service provision in a mobile communication system.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
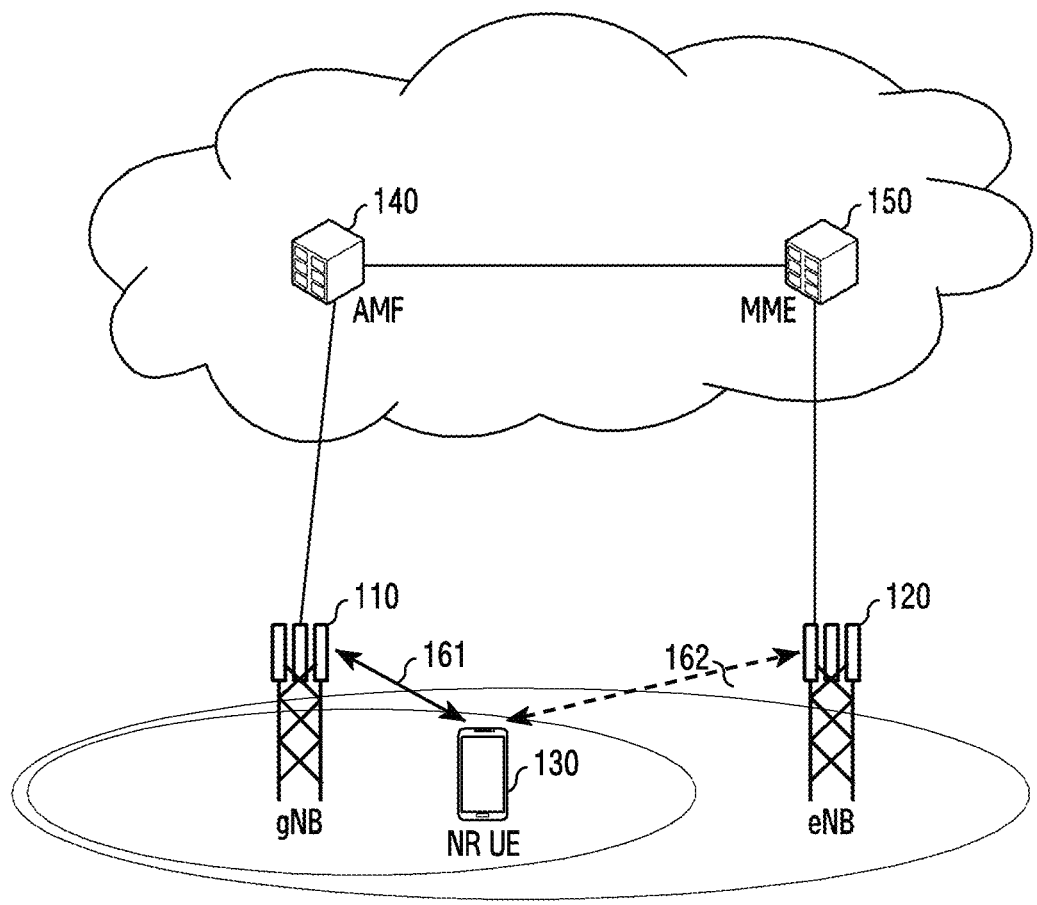
FIG. 1 illustrates a wireless communication system according to various embodiments.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In describing the embodiments in detail, the radio access network New RAN (NR) on the 5G mobile communication standard and the packet core (5G system, 5G core network, or next-generation (NG) core), which is a core network, specified by 3GPP, the standardization organization for mobile communication standards, are the main target, but the main subject matter of the disclosure can be applied to other communication systems having similar technical backgrounds with slight modification within a range not exceeding the scope of the disclosure, which will be possible by the judgment of those skilled in the technical field of the disclosure.

In the 5G system, a network data collection and analysis function (NWDAF), which is a network function that provides a function for analyzing and providing data collected in a 5G network, may be defined to support network automation. The NWDAF can collect/store/analyze information from 5G networks and provide the results to unspecified network functions (NF), and the analysis results can be used independently in each NF.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms referring to network entities, terms referring to device elements, and the like are illustratively used for the sake of convenience. Therefore, the disclosure is not limited by the terms as used below, and other terms referring to subjects having equivalent technical meanings may be used. It should be noted that, throughput the disclosure, the terms "dual connectivity" and "multi-connectivity" have the same meaning and are interchangeably used with each other. The metrics for signal gain and signal quality used in the following description may be, for example, at least one of beam reference signal received power (BRSRP), reference signal received power (RSRP), reference signal received quality (RSRQ), a received signal strength indicator (RSSI), a signal-to-interference-and-noise ratio (SINR), a carrier-to-interference-and-noise ratio (CINR), a SNR, an error vector magnitude (EVM), a bit error rate (BER), and a block error rate (BLER). In addition to the examples described above, other terms having equivalent technical meanings or other metrics indicating signal quality can be used.

In the disclosure, the above or the following expressions are used to determine or describe the operation or fulfillment of a certain condition (fulfilled), which is only a description for expressing an example, and is not intended to exclude the description of "more or less". Conditions described as "equal to or greater" can be replaced with "exceeding", and conditions described as "equal to or greater and below" can be replaced with "exceeding and equal to or less".

Further, various embodiments of the disclosure will be described using terms defined in some communication systems (e.g., 3rd generation partnership project (3GPP)) for the convenience of description. However, various embodiments of the disclosure may be easily modified and applied to other communication systems.

In the following description of the embodiments, when it is determined that a detailed description of related known functions or configurations may unnecessarily obscure the subject matter of the disclosure, the detailed description will be omitted. Hereinafter, various embodiments will be described with reference to the accompanying drawings.

FIG. 1 illustrates a wireless communication system according to various embodiments.

Each of base stations 110 and 120 is a network infrastructure element that provides radio access to a terminal 130. Each of the base stations 110 and 120 has coverage defined as a constant geographic area based on the distance over which it is possible to transmit a signal. The base station 110 may be referred to as an "access point (AP)," a "5$^{th}$-generation node (5G node)," a "wireless point," a "transmission/reception point (TRP)," or using another term having an equivalent technical meaning, in addition to "base station". In addition, the base station 120 may be referred to as an "access point (AP)," an "eNodeB (eNB)," a "wireless point," a "transmission/reception point," or using other terms having an equivalent technical meaning, in addition to "base station".

The terminal 130 is a device used by a user, and performs communication via a radio channel with the base station 110 or the base station 120. In some cases, the terminal 130 may be operated without user intervention. That is, the terminal 130 may be a device that performs machine-type communication (MTC) and might not be carried by a user. The terminal 130 may be referred to as a "user equipment (UE)," "mobile station," "subscriber station," "remote terminal," "wireless terminal," "user device," or using some other term having an equivalent technical meaning, in addition to "terminal".

Referring to FIG. 1, a radio access network of a next-generation wireless communication (new radio (NR)) system may include a next-generation base station (new radio node B, hereinafter gNB) 110 and access and mobility management (AMF) 140, which is the configuration of a core network of NR. The terminal (NR user equipment, NR UE) 130 accesses the external network through the gNB 110 and the AMF 140.

As shown in FIG. 1, the gNB 110 corresponds to an evolved node B (eNB) 120 of an existing long term evolution (LTE) system. The gNB 110 is connected to the NR UE 130 through a radio channel 161 and can provide service with performance superior to that of the eNB 120. In the next-generation mobile communication system, since all user traffic is serviced through a shared channel, a device that collects state information such as buffer states, available transmission power states, and channel states of terminals and performs scheduling is required. The above-described functions may be performed by the gNB 110. One gNB generally controls a plurality of cells. In order to implement ultra-fast data transmission compared to the LTE system, a bandwidth greater than or equal to the existing maximum bandwidth may be used in the NR system, and beamforming technology may be combined with orthogonal frequency-division multiplexing (OFDM). In addition, an adaptive modulation and coding (AMC) method for determining a modulation scheme and a channel-coding rate based on the channel state of a terminal is applied. The AMF 140 performs functions such as mobility support, bearer configuration, and QoS configuration. The AMF 140 is a device in charge of various control functions as well as a mobility management function for a terminal, and may be connected to a plurality of base stations. In addition, the NR system may also be linked with the LTE system, and the AMF 140 is connected to a mobility management entity (MME) 150 and a network interface. The MME 150 is connected to the eNB 120, which is an LTE base station. A terminal supporting LTE-NR dual connectivity may transmit and receive data while maintaining a connection to the eNB 120 as well as the gNB 110 (161, 162).

Figure 2:
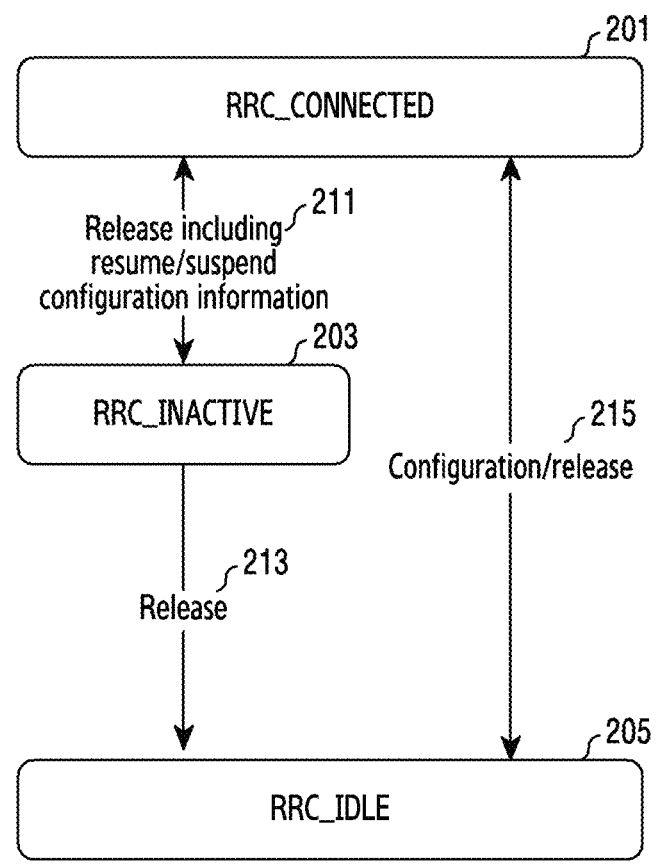
FIG. 2 illustrates a transition of a wireless connection state in a wireless communication system according to various embodiments.

FIG. 2 illustrates transition of a wireless connection state in a wireless communication system according to various embodiments.

Referring to FIG. 2, there are three types of radio access control (RRC) in the NR system. The connected mode (RRC_CONNECTED) 201 refers to a wireless connection state in which a terminal can transmit and receive data. The idle mode (RRC_IDLE) 205 refers to a radio access state in which the terminal monitors whether paging is transmitted to the terminal itself. The above two modes are also applied in an LTE system. Therefore, the detailed description of the two modes described above is the same as that of the LTE system. In the NR system, an inactive mode (RRC_INACTIVE) 203 is newly defined. In the inactive mode, a terminal context is maintained for the base station and the terminal, and radio access network (RAN)-based paging is supported. Features of the inactive mode are described below.

Cell re-selection mobility;
Core network (CN) for the terminal-NR RAN connection (control plane and user plane) is established;

The terminal access stratum (AS) context is stored in at least one of the gNB and the terminal;
Paging is initiated by NR RAN;
RAN-based notification area is managed by NR RAN;
NR RAN knows the RAN-based notification area to which the terminal belongs.

The new inactive mode may transition to a connected mode or an idle mode using a specific procedure. According to the resume process, the mode is switched from the inactive mode to the connected mode, and the connected mode is switched to the inactive mode through a release procedure including suspension configuration information (211). The above-described procedure consists of one or more steps for transmitting and receiving one or more RRC messages between the terminal and the base station. In addition, it is possible to switch from the inactive mode to the idle mode through a release procedure after resuming (213). Switching between the connected mode and the idle mode is performed according to the existing LTE technology. That is, switching between a connected mode and an idle mode is accomplished through an establishment or release procedure (215).

Figure 3:
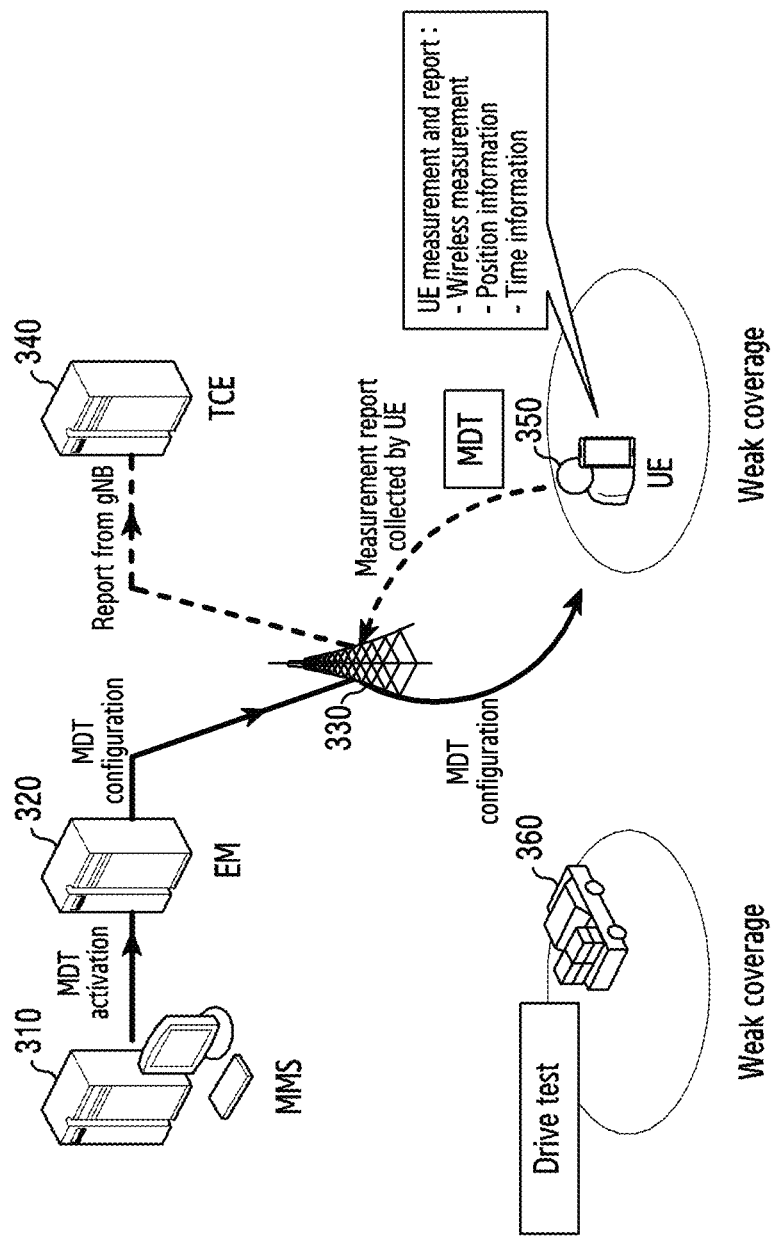
FIG. 3 illustrates collection and reporting of exemplary cell measurement information in a wireless communication system in accordance with various embodiments.

FIG. 3 illustrates collection and reporting of exemplary cell measurement information in a wireless communication system in accordance with various embodiments.

When establishing or optimizing a network, a mobile communication service provider generally measures signal strength in an expected service area and performs a procedure of deploying or readjusting base stations in the service area based on the measurement result. The provider loads signal measurement equipment into a vehicle and collects cell measurement information in the service area, which is time-consuming and expensive. Since the above-described procedure generally uses a vehicle, the procedure is commonly referred to as a drive test. In order to support operations such as cell reselection or handover or adding a serving cell when moving between cells, the terminal is equipped with a function for measuring a signal with respect to a base station. Therefore, instead of the drive test, a terminal in the service area can be utilized. As described above, the test using the terminal is referred to as a minimization of drive test (MDT). The provider may be configured to perform MDT operation using specific terminals through various configuration devices of the network. Accordingly, the terminals collect and store signal strength information from the serving cell and neighboring cells in the connected mode (RRC_CONNECTED), the idle mode (RRC_IDLE), or the inactive mode (RRC_INACTIVE). In addition, various information such as location information, time information, and signal quality information may be stored. The stored information is reported to the network and transmitted to a specific server when the terminals operate in the connected mode.

MDTs are classified into immediate MDT and logged MDT.

The immediate MDT is characterized in that the terminal immediately reports the collected information to the network. Since the information should be reported immediately, the immediate MDT can be performed by a terminal operating in connected mode. In general, radio resource management measurement (RRM) processes to support operations such as handover and serving cell addition are performed again, and location information and time information are additionally reported.

The logged MDT is characterized in that the information collected by the terminal is stored immediately without being reporting to the network, and the stored information is reported after the terminal is switched to the connected mode. In general, the logged MDT is performed by a terminal in an idle mode, in which it is impossible to immediately report the collected information to the network. The terminal in the inactive mode introduced in the NR system performs the logged MDT. When a specific terminal is in a connected mode, configuration information for performing the logged MDT operation is provided to the terminal. After switching to the idle mode or the inactive mode, the terminal collects and stores the configuration information. In the following Table 1, the RRC state classification of the terminal capable of performing the corresponding MDT according to the MDT type is described.

TABLE 1

| MDT type | RRC state |
| --- | --- |
| Immediate MDT | RRC_CONNECTED |
| Logged MDT | RRC_IDLE or RRC_INACTIVE |

Figure 4:
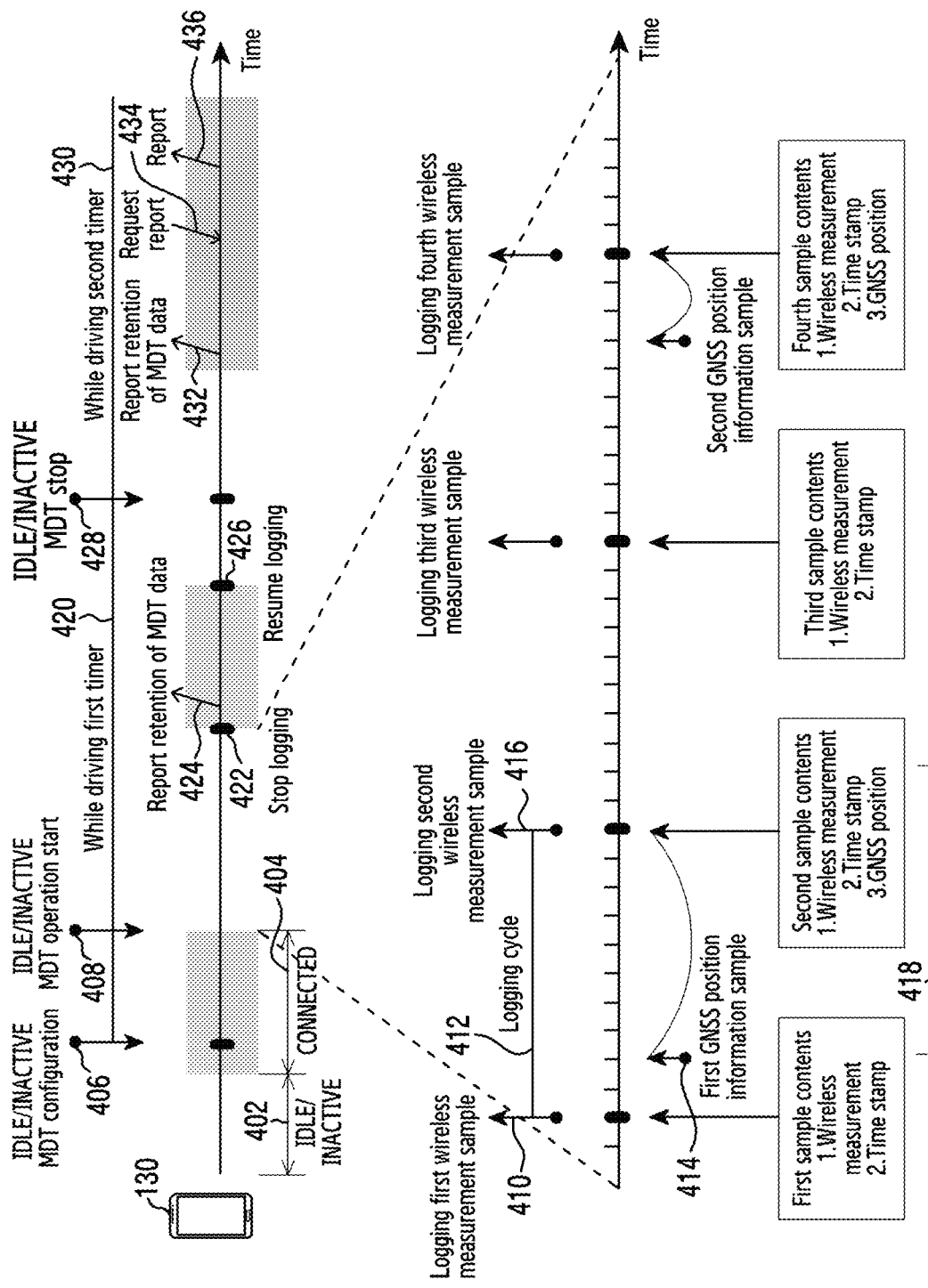
FIG. 4 is a temporal flowchart of a procedure for collecting and reporting cell measurement information in a wireless communication system according to various embodiments.

FIG. 4 is a temporal flowchart of a procedure for collecting and reporting cell measurement information in a wireless communication system according to various embodiments.

Referring to FIG. 4, the terminal 130 is switched from the idle mode or the inactive mode 402 to the connected mode 404. In the connected mode, the terminal collects MDT data through the immediate MDT operation and reports the same to the base station. The terminal switched to the connected mode receives the logged MDT configuration information performed in the idle mode or the inactive mode from the base station (406). The logged MDT configuration information includes a predetermined RRC message and is transmitted to the terminal. The terminal receiving the logged MDT configuration information drives the first timer (420). The terminal performs the MDT operation logged in the idle mode or the inactive mode until the first timer expires. The value of the first timer is included in the logged MDT configuration information. When the terminal is switched to the idle mode or the inactive mode, the terminal performs the logged MDT, based on the received configuration information (408). The terminal stores the collected information every logging interval 412, which is a configured period (410, 416). In addition, when valid location information 414 is collected, the collected location information must also be stored. Whether the location information is valid is determined based on the amount of time that has elapsed since the location information was collected. For example, if the predetermined time 418 has not elapsed since the location information was collected, it is determined that the collected location information is valid. Here, the predetermined time is shorter or equal to the logging period.

Even before the first timer expires, the terminal temporarily stops the logged MDT operation from being performed when the terminal is switched to the connected mode (422). However, the first timer does not stop even in the connected mode operation period, and continues to run. That is, the first timer continues to operate regardless of the change in the RRC state. However, when the capacity of the terminal memory for storing the MDT data is insufficient and no more data can be stored, or when the logged MDT configuration information is released, the first timer is stopped. When the logged radio access technology (RAT) or other logged MDT configuration information is provided from another RAT, or the terminal is disconnected or the power supply is interrupted, the logged MDT configuration information is released. During the connection establishment process (RRC connection establishment) or the connection resume process (RRC connection resume), the terminal reports to the base station that the terminal is holding the collected MDT data using an RRC message (424). The connection resume process is a process in which the terminal switches from the inactive mode to the connected mode. As described below, the connection resume process is composed of three steps, and in this case, three types of RRC messages are used.

Step 1: The terminal transmits an RRC resume request message to the base station
Step 2: The base station transmits an RRC resume message to the terminal
Step 3: The terminal transmits an RRC resume complete message to the base station Depending on the purpose of the resumption, the connection resume process may consist of two steps. For example, the resumption process for updating the RAN-level notification areas (RNA) consists of the following two steps.

Step 1: The terminal transmits an RRC Resume Request message to the base station
Step 2: The base station transmits an RRC Resume message to the terminal In addition to the above-described connection establishment process or connection resume process, during the RRC connection reestablishment or handover process, the terminal reports information indicating that the terminal has collected information to the target base station. If the logged MDT is configured but no information is collected or stored yet, the terminal omits the report. Upon receipt of the report, the base station may request reporting of MDT data stored by the terminal, if necessary. MDT data that is not reported is continuously stored by the terminal for a predetermined time. If the terminal switches to the idle mode or the inactive mode again, and the first timer has not yet expired, the terminal resumes the logged MDT operation (426). When the first timer expires, the terminal stops the logged MDT operation (428). The terminal, which has stopped the logged MDT operation, drives the second timer (430), and retains the stored MDT data until the second timer expires. After the second timer expires, whether to delete the stored MDT data is determined by the terminal implementation. The value of the second timer is included in the logged MDT configuration information, or a predefined value is applied without being configured. When the terminal is switched back to the connected mode, the terminal reports to the base station that the terminal is holding the collected MDT data (432). The base station requests reporting of MDT data stored by the terminal using the RRC message (434). The terminal receives the MDT data being stored in the RRC message, and reports the message to the base station (436).

Figure 5:
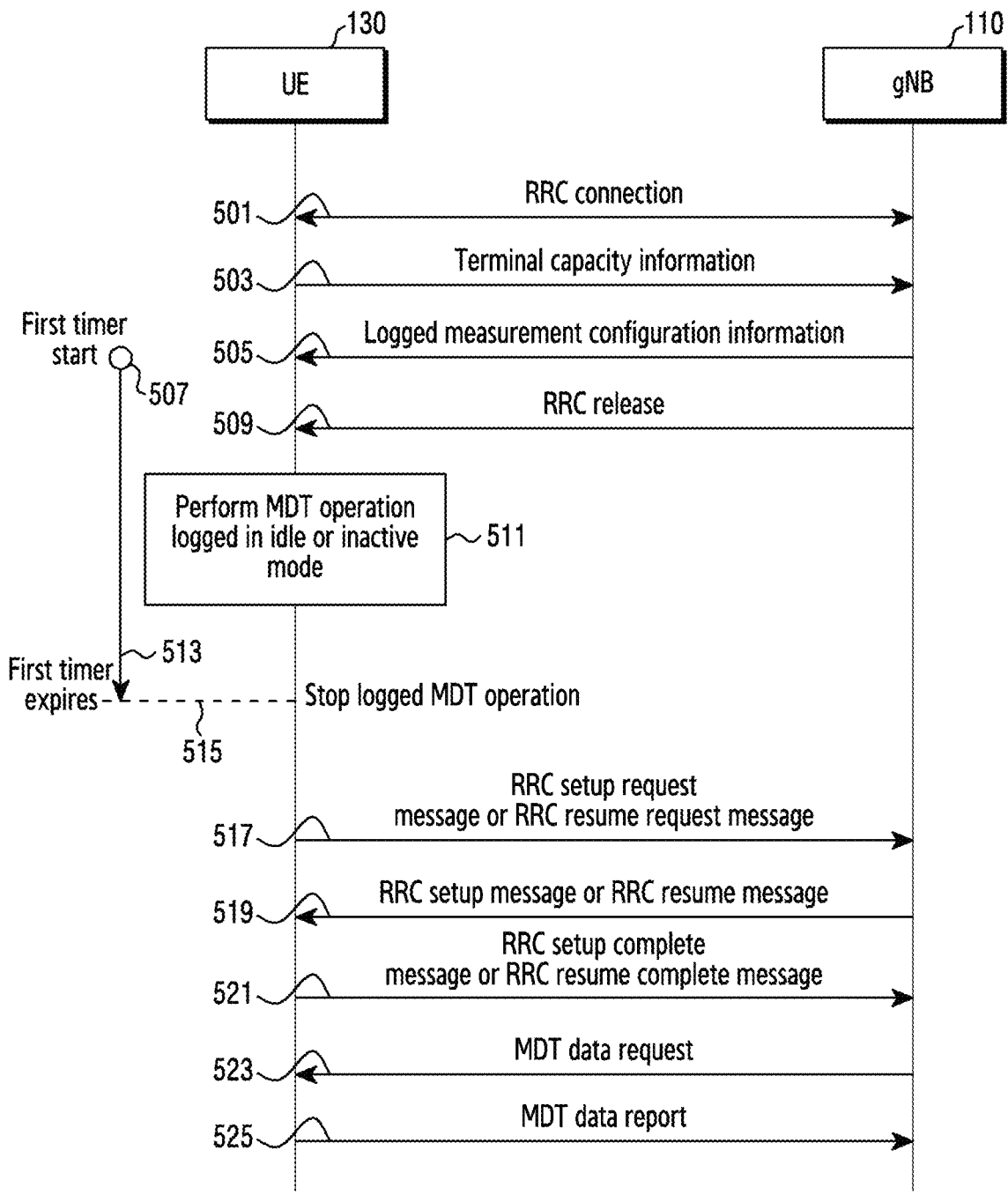
FIG. 5 is a signal exchange diagram for collecting and reporting cell measurement information in a wireless communication system according to various embodiments.

FIG. 5 is a signal exchange diagram for collecting and reporting cell measurement information in a wireless communication system according to various embodiments. As illustrated in FIG. 5, signal exchange is performed between a terminal 130 and a gNB 110, which is a base station.

Referring to FIG. 5, in operation 501, the terminal establishes a connection with the base station. That is, the terminal can establish an RRC connection with the base station.

In operation 503, the terminal transmits terminal capability information to the base station. Specifically, based on whether the terminal supports the MDT operation and the conquering terminal capability, information about the frequency that the terminal can measure may be indicated.

In operation 505, the base station transmits a logged measurement configuration (logged measurement configuration) to the terminal. Specifically, the base station performs transmission to the terminal by including the configuration information necessary to perform the logged MDT operation in a predetermined RRC message. According to various embodiments, the configuration information includes at least one of the following pieces of information.

Trace reference information
Trace recording session reference information
Trace collection entity (TCE) identification (ID) information: the base station transmits the MDT data information reported from the terminal to the data server designated by the TCE ID.
Absolute time information: Absolute time in the current cell providing logged MDT configuration information
Area configuration information: Through the logged MDT operation, information about an area capable of collecting and storing measurement information is indicated in units of cells. In addition, the region configuration information may include information on a RAT, which is a measurement information collection target. The list included in the RAT information may be a black list or a white list. For example, if the list is a black list, cell measurement information for RATs not included in the list is collected. For example, if the list is a white list, cell measurement information is not collected for RATs not included in the list.
Logging duration: The value of the first timer. When the timer is running, the terminal performs the MDT operation logged in the idle mode or the inactive mode.
Logging interval: The interval at which collected information is stored.
Public land mobile network (PLMN) identification list (plmn-IdentityList): PLMN list information. The PLMN list information includes PLMN information capable of reporting whether MDT data is stored and reporting MDT data, as well as performing logged MDT operations.
In the idle mode, the inactive mode, or both modes, an indicator indicating whether the terminal performs the logged MDT operation is provided. Using the indicator, an RRC state for performing a logged MDT operation may be indicated. Alternatively, without the indicator, it may be defined that the terminal always performs the MDT operation logged in the idle mode and the inactive mode. The terminal performs the MDT operation logged only in the RRC state indicated by the indicator.
An indicator indicating whether the terminal collects and stores beam-level measurement information. In an NR system, a beam antenna may be applied. Alternatively, it may be defined that the terminal always collects and stores beam-level measurements for a frequency at which a beam-based operation is performed without the indicator. For example, in an NR system, a beamforming system may be used between a base station and a terminal.
Maximum value information of the number of beams collected or stored, and minimum signal strength information of the stored beams: The terminal omits storing information on a beam having a signal strength weaker than a configured value, based on the minimum signal strength information of the beam. The terminal may store information on a beam having a signal strength greater than or equal to a configured value, based on the minimum signal strength information of the beam. If all the beams are weaker than the configured minimum signal value, the terminal stores information on the beam having the strongest signal strength, or includes an indicator that all of the beams are weaker than the configured minimum signal value in the configuration information.

An indicator indicating whether or not MDT data retrieval operation can be triggered in a two-step resume process (RRC resume)

In operation 507, the terminal receiving the logged MDT configuration information drives the first timer. The value of the first timer is configured equal to the value of the logging period.

In operation 509, the base station uses the RRC release message to switch the terminal to an idle mode or an inactive mode. According to the RRC state to be switched to, the RRC release message includes configuration information for operation in the corresponding RRC state.

If the first timer is running, in operation 511, the terminal performs MDT logged in the idle mode or the inactive mode. The terminal measures signal strengths of the serving cell and surrounding cells and acquires location information. When beam-level measurement is configured, the terminal collects and stores signal strength values for a beam having a signal strength greater than the configured minimum value in the serving cell and the adjacent cell. In this case, the maximum value of the number of beams that the terminal can store may be configured in configuration information, or may be predefined. According to various embodiments, the signal strength is a reference signal received power (RSRP), a reference signal received quality (RSRQ), or a signal-to-interference-plus-noise ratio (SINR). The terminal stores the collected information for each logging interval. Each log information stored for each interval includes an indicator for indicating whether the stored information is collected in idle mode or inactive mode. Alternatively, the indicator may be included for each piece of initial log information after the mode is switched. In this case, signaling overhead due to the indicator can be minimized.

In operation 513, if the first timer expires, in operation 515, the terminal stops the logged MDT operation.

If the terminal operates in an idle mode or an inactive mode by the RRC release message and the terminal receives RAN paging or core-network (CN) paging from a base station, or when the transmission of mobile-originated (MO) data, which is data generated by the terminal, is activated, the terminal initiates a configuration process or a resume process for switching from the idle mode or inactive mode to the connected mode.

The configuration process or resume process is composed of three steps as described below.

Step 1: The terminal transmits an RRC configuration request message or an RRC resume request message to the base station (e.g., operation 517).

Step 2: The base station transmits an RRC configuration message or an RRC resume message to the terminal (e.g., operation 519).

Step 3: The terminal transmits an RRC configuration complete message or an RRC resume complete message to the base station (e.g., operation 521).

In this case, the terminal includes an availability indicator, which is an indicator for indicating whether MDT data stored in the terminal exists in the RRC configuration complete message or the RRC resume complete message.

When necessary, the base station, receiving the RRC configuration complete message, requests the terminal to report the MDT data using the RRC message in operation 523.

In operation 525, the terminal, having received the request, reports the MDT data to the base station using a predetermined RRC message.

Multiple-access wireless technology is a technology in which a terminal can be provided with services from two or more base stations by being connected to two or more base stations. In this case, the two base stations can provide service to the terminal through mutual interworking. That is, the base stations can provide service to the terminal in a range not exceeding the capability of the terminal by using a separate scheduler included in each of the base stations. In various embodiments, dual connectivity (DC) may be considered as a multiple-access wireless technology. The base station to which the primary cell (PCell) belongs is referred to as a master node (MN), and the base station to which the PCell does not belong is referred to as a secondary node (SN). There are several types of multiple-access wireless technology according to the RAT to which the base stations belong. For example, multiple-access wireless technology between NR base stations may be referred to as NR-NR DC, multiple-access wireless technology between an LTE base station (PCell) and an NR base station may be referred to as EN-DC, and multiple-access wireless technology between an NR base station (PCell) and an LTE base station may be referred to as NE-DC. In general, in the logged MDT, only the cell, frequency, and RAT measured for cell reselection are considered. The cell, frequency, and RAT information is provided as system information including cell reselection configuration information. If the SN is not related to cell reselection, measurement information on the frequency used by the SN or the RAT to which the SN belongs in the logged MDT will not be collected. Hereinafter, the disclosure proposes an MDT operation configured by an SN in a multiple-access state.

Figure 6:
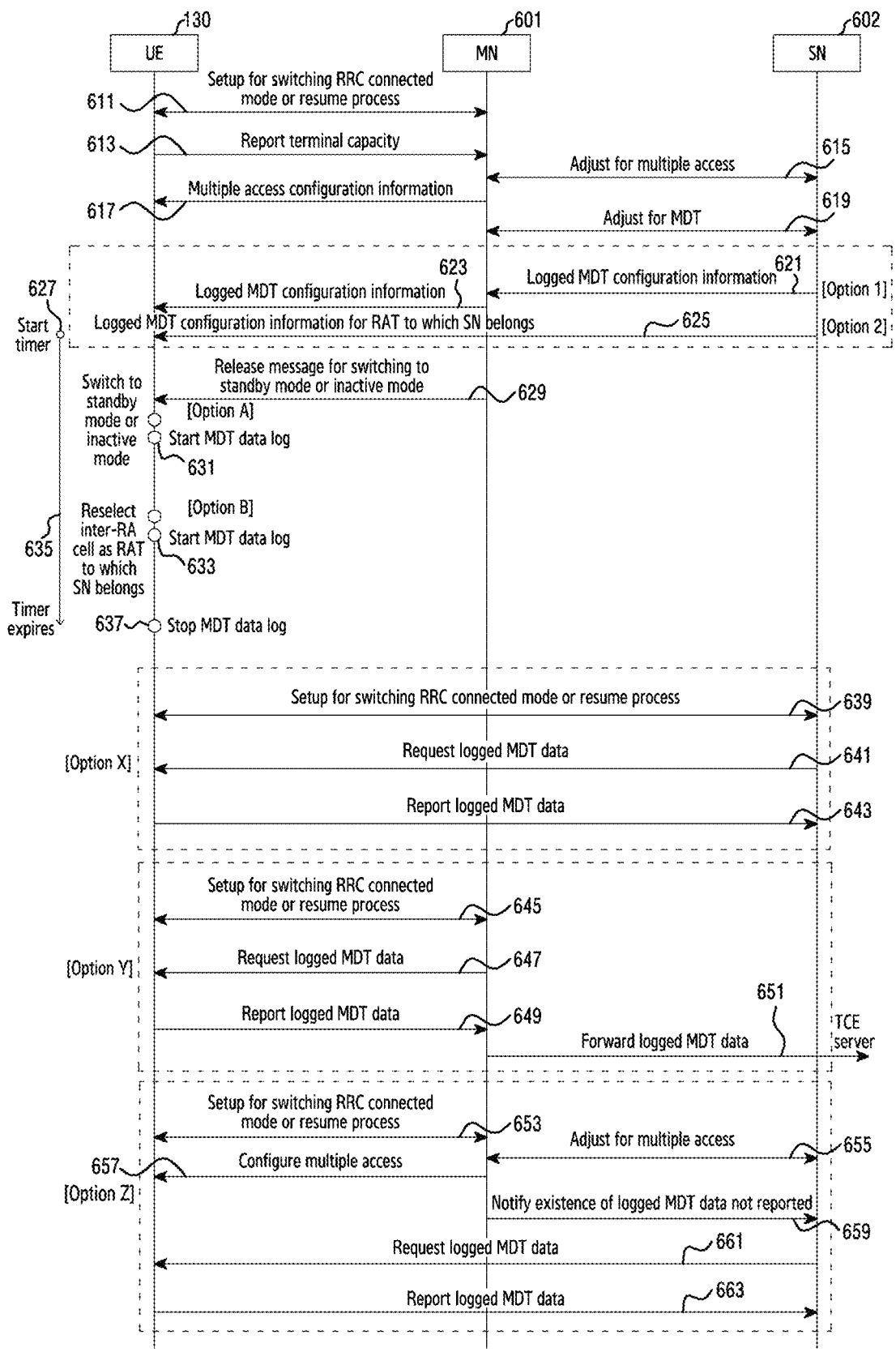
FIG. 6 is a signal exchange diagram for collecting and reporting idle mode measurement information in a multiple-access state in a wireless communication system according to various embodiments.

FIG. 6 is a signal exchange diagram for collecting and reporting idle mode measurement information in a multiple-access state in a wireless communication system according to various embodiments.

Referring to FIG. 6, in operation 611, the terminal 130 in the idle mode or the inactive mode switches to the connected mode (RRC_CONNECTED) through a configuration (establishment) procedure or a resume process.

In operation 613, the terminal reports the terminal capability information to the MN (601). The capability information includes at least one of information on whether the terminal supports multiple-access wireless technology, information on a combination of frequency bands and frequency bands supporting multiple access, and whether the terminal can support logged MDT and immediate MDT.

In operation 615, if it is determined that the MN needs to configure the multiple-access wireless technology, the SN 602 provides terminal capability information, configuration information related to the MN, and cell measurement result information. In this case, the SN transmits configuration information related to the SN for supporting the terminal to the MN.

In operation 617, the MN forwards the configuration information received from the SN to the terminal. The terminal is switched to a multiple-access state, in which services are provided by the two base stations.

The SN may configure the MDT logged to the terminal. In operation 619, the SN performs adjustment for the MN and the MDT. Specifically, the SN determines whether or not to trigger the MDT logged through the inter-node coordination with the MN and the MDT configuration information logged. The logged MDT configuration information may correspond to configuration information for MDT operation for the RAT to which the SN belongs.

If a signaling radio bearer (SRB) capable of directly transmitting an RRC message between the SN and the terminal is configured, in operation 625, the SN directly transmits the logged MDT configuration information to the terminal (Option 2). For example, if SRB3 is configured between the SN and the terminal in EN-DC, the SN directly transmits the logged MDT configuration information to the terminal.

If the SRB is not configured between the SN and the terminal, in operation 621, the SN transmits the logged MDT configuration information to the MN (Option 1). In this case, a separate container for the logged MDT configuration information may be defined. Since the MN does not need to decode the logged MDT configuration information triggered by the SN, the logged MDT configuration information may be delivered through the container.

In operation 623, the MN forwards the logged MDT configuration information triggered by the SN to the terminal using a predetermined RRC message. For example, a loggedMeasurementConfiguration message can be forwarded the terminal. In this case, the logged MDT configuration information triggered by the MN may be provided to the terminal therewith. The logged MDT configuration information triggered by the SN explicitly includes conventional configuration information and frequency and RAT information to be measured. In addition, a white cell list including cells to be measured for each indicated frequency or RAT or a black cell list including cells that do not need to be measured is included in the logged MDT configuration information. The frequency and RAT information may be provided implicitly, and the frequency and RAT to be measured may be the RAT and frequency of cells belonging to the SN. For example, the frequency and RAT information may be the RAT and frequency of a primary secondary cell (PSCell) belonging to the SN.

In operation 627, the terminal receiving the logged MDT configuration information initiated by the SN starts a timer. Until the timer expires (operation 635), when in the idle mode or the inactive mode (operation 631), the terminal performs the logged MDT operation initiated by the SN if the terminal always satisfies a predetermined condition (option A). The terminal switched to the idle mode or the inactive mode performs the logged MDT operation initiated by the SN. The terminal may record cell measurement results in a cell order that provides the best signal strength for each configured RAT or for each configured frequency. Alternatively, the terminal may record a predetermined number of cell measurement results for each configured RAT or for each configured frequency.

In operation 633, the terminal may perform the logged MDT operation initiated by the SN only when the inter-RAT cell is reselected with the RAT to which the SN belongs (option B). In order to prevent unnecessary operation of the terminal, the terminal may perform a measurement operation on the configured frequency or RAT only when the configured frequency or RAT is indicated as the frequency or RAT of neighboring cells through system information. Measurement results collected through the logged MDT operation initiated by the SN may be stored in an entry different from the measurement results collected through the logged MDT operation initiated by the MN. In this case, the network may optionally obtain the measurement result of the logged MDT initiated by the MN or the measurement result of the logged MDT initiated by the SN. When the timer expires (operation 633), in operation 637, the terminal stops the logged MDT operation initiated by the SN. In the case of an LTE system, the above-mentioned entry means an information element (IE) log measurement information (logMeasInfo) or a set of IE log measurement information lists (LogMeasInfoList).

Measurement results collected through the logged MDT operation initiated by the SN may be recovered through the following procedures.

Hereinafter, operations 639 to 643 are described below as a procedure related to option X.

In operation 639, the terminal may switch to a connected mode in a cell belonging to the frequency and RAT used by the SN. In this case, if the cell supports at least one of the PLMNs belonging to the PLMN list included in the logged MDT configuration information initiated by the SN, the terminal includes an availability indicator in the RRCSetupComplete message or the RRCResumeComplete message. The availability indicator indicates that the terminal has a measurement result recorded through a logged MDT operation. For the logged MDT initiated by SN, a separate availability indicator may be used.

In operation 641, the serving cell receiving the indicator requests MDT data logged to the terminal. That is, the SN requests the terminal to transmit the logged MDT measurement result.

In operation 643, the terminal reports the MDT data logged to the SN. The terminal reports the measurement result of the logged MDT to the SN.

Hereinafter, operations 645 to 651 are described below as a procedure related to option Y.

In operation 645, the terminal may be switched to a connected mode in a cell belonging to the RAT of the MN, which is different from the RAT of the SN. In this case, if the cell supports at least one of the PLMNs belonging to the PLMN list included in the logged MDT configuration information initiated by the SN, the terminal includes the availability indicator in the RRCSetupComplete message or the RRCResumeComplete message.

In operation 647, the serving cell receiving the indicator requests the MDT data logged to the terminal. That is, the MN requests the terminal to transmit the logged MDT measurement result.

In operation 649, the terminal reports the MDT data logged to the MN. The terminal reports the logged MDT measurement result to the MN. In this case, the terminal may transmit the logged MDT data to the MN using a separate container.

In operation 651, the MN forwards the logged MDT data received from the terminal to the TCE server. Specifically, the base station transmits the collected measurement result to the TCE server indicated by the TCE ID included in the logged MDT configuration information. That is, even if the RAT providing the logged MDT configuration information and the RAT for recovering the measurement result are different, if the RAT for recovering the measurement result supports the PLMN belonging to the configured PLMN list, the measurement result may be recovered. The PLMN list is common to the logged MDT initiated by the MN and the logged MDT initiated by the SN, or the PLMN list included in the logged MDT configuration information initiated by the MN even for the logged MDT operation and the retrieval operation initiated by the SN may be applied.

Hereinafter, operations 653 to 663 are described as procedures related to option Z.

In operation 653, the terminal may switch to a connected mode in a cell belonging to the RAT of the MN, which is different from the RAT of the SN. In this case, if the cell supports at least one of the PLMNs belonging to the PLMN list included in the logged MDT configuration information disclosed in the SN, the terminal includes the availability indicator in the RRCSetupComplete message or the RRCResumeComplete message even if the RAT providing the logged MDT configuration information and the RAT for recovering the measurement result are different. The PLMN list is common to the logged MDT initiated by the MN and the logged MDT initiated by the SN, or the PLMN list included in the logged MDT configuration information initiated by the MN even for the logged MDT operation and the retrieval operation initiated by the SN may be applied.

In operation 655, the MN performs an adjustment procedure for multiple access with the SN. Specifically, when it is determined that the MN needs to configure multiple-access wireless technology, the SN provides terminal capability information, configuration information related to the MN, and cell measurement result information. In this case, the SN transmits configuration information related to SN for supporting the terminal to the MN.

In operation 657, the MN forwards the configuration information received from the SN to the terminal. The terminal is switched to a multiple-access state, in which services are provided by the two base stations.

In operation 659, if a logged MDT measurement result initiated by the unrecovered SN exists, the MN notifies the SN that the unrecovered measurement result exists using a predetermined indicator.

In operation 661, the SN, which has received the indicator, directly requests the terminal to report the measurement result if an SRB capable of directly transmitting an RRC message between the SN and the terminal is configured. Otherwise, although not shown in FIG. 6, the SN delivers the request to the terminal via the MN.

Upon receiving the request directly from the SN, in operation 663, the terminal reports the measurement result to the SN. Otherwise, although not shown in FIG. 6, the terminal reports the measurement result to the MN. When the terminal reports the measurement result collected through the logged MDT initiated by the SN to the MN, the measurement result may be transmitted by including the measurement result in a separate container.

According to another embodiment, the SN may provide frequency and RAT information for measurement to the MN, and the MN may provide the frequency and RAT information to the terminal together when configuring the logged MDT. For example, if an SRB capable of directly transmitting an RRC message between the SN and the terminal is not configured, the SN provides the MN with the frequency and RAT information that needs to be measured during the logged MDT operation. The MN receiving the information may trigger the logged MDT, and may include the information in an RRC message such as a logged measurement configuration (loggedMeasurementConfiguration) message. Upon receiving the RRC message, the terminal also measures and stores the frequency and RAT provided through the RRC message in addition to the frequency, cell, and RAT to be measured for cell reselection provided through system information.

If the serving cell supports at least one of the PLMNs belonging to the PLMN list provided through the RRC message, the terminal switched to the connected mode includes the availability indicator in the RRCSetupComplete message or the RRCResumeComplete message. When the terminal receives an MDT data request from the serving base station, the terminal reports the stored MDT measurement result to the base station.

Figure 7:
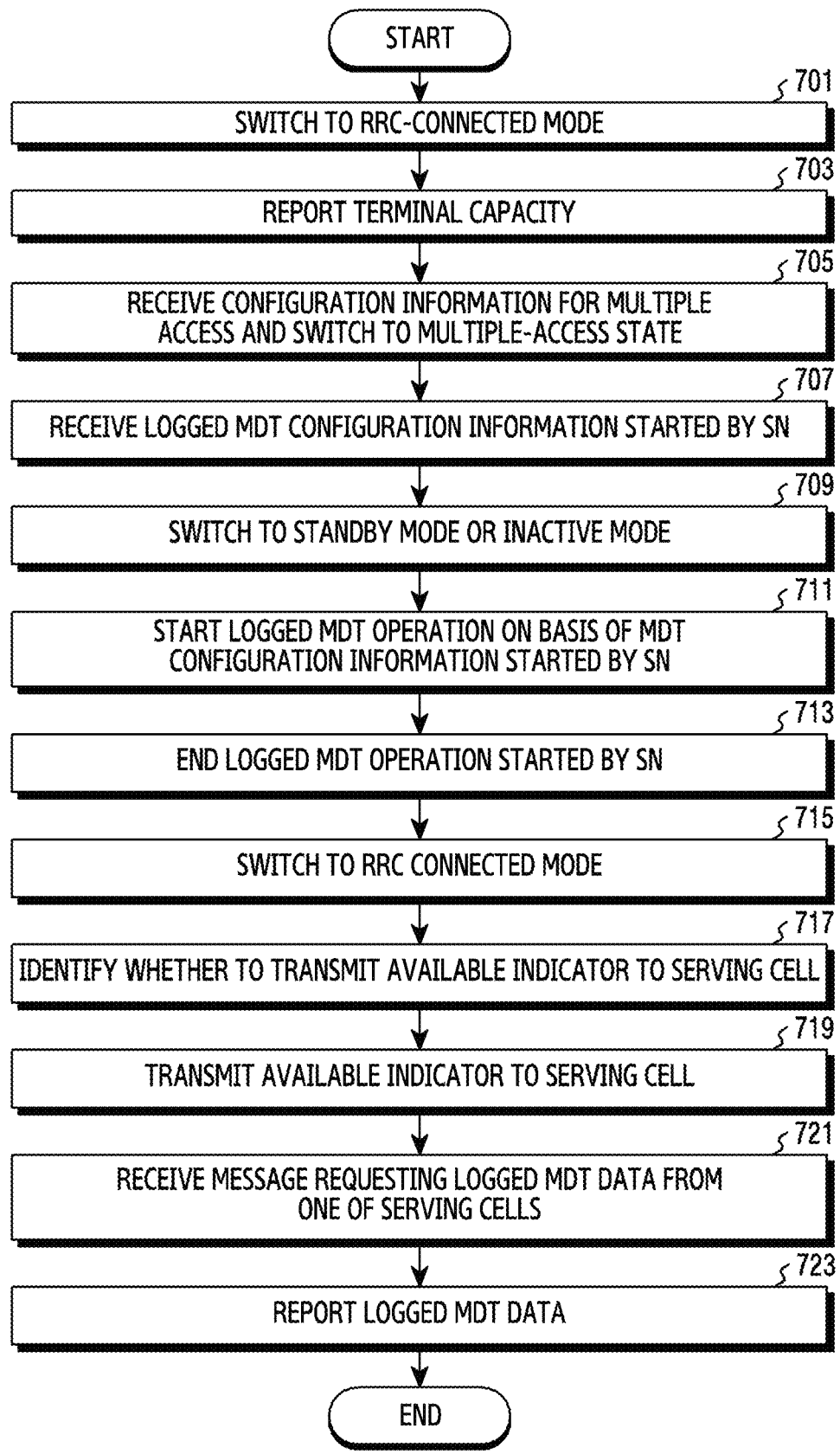
FIG. 7 is a flowchart of a terminal for collecting and reporting idle mode measurement information in a multiple-access state in a wireless communication system according to various embodiments.

FIG. 7 is a flowchart of a terminal for collecting and reporting idle mode measurement information in a multiple-access state in a wireless communication system according to various embodiments. FIG. 7 illustrates the operation of the terminal 130.

In operation 701, the terminal switches to the RRC connected mode. Specifically, the terminal in the idle mode or the inactive mode switches to the connected mode through a configuration process or a resume process.

In operation 703, the terminal reports the terminal capability information to the MN. According to various embodiments, the capability information includes at least one of information related to whether the terminal can support multiple-access wireless technology, information related to frequency bands supporting multiple access and a combination of frequency bands, and information related to whether the terminal is capable of supporting the logged MDT or immediate MDT function.

In operation 705, the terminal receives configuration information for multiple access and switches to a multiple-access state in which service is provided from two base stations.

In operation 707, the terminal receives the logged MDT configuration information initiated by the SN. Specifically, when an SRB capable of directly transmitting an RRC message between the SN and the terminal is configured, the terminal may directly receive the logged MDT configuration information from the SN. When the SRB is not configured between the SN and the terminal, the terminal may receive the logged MDT configuration information transmitted from the SN through the MN.

In operation 709, the terminal switches from the RRC connected mode to an idle mode or an inactive mode.

In operation 711, the terminal initiates the logged MDT operation based on the MDT configuration information initiated by the SN. Specifically, when the terminal is in the idle mode or the inactive mode, the terminal performs the logged MDT operation initiated by the SN, either constantly or when a predetermined condition is satisfied. Alternatively, when inter-RAT cell reselection is performed with the RAT to which the SN belongs, the terminal may perform the logged MDT operation initiated by the SN.

In operation 713, when the timer expires, the terminal ends the logged MDT operation initiated by the SN.

In operation 715, the terminal switches to a connected mode through a configuration process or a resume process.

In operation 717, the terminal identifies whether to transmit an availability indicator to the serving cell. Specifically, the terminal identifies whether it is possible to inform the serving cell of the presence of MDT data stored in the terminal. For example, the terminal may identify whether the base station supports at least one of the PLMNs belonging to the PLMN list included in the logged MDT configuration information initiated by the SN. If the cell supports at least one of the PLMNs belonging to the PLMN list included in the logged MDT configuration information initiated by the SN, the terminal may include the availability indicator in the RRCSetupComplete message or the RRCResumeComplete message.

In operation 719, the terminal transmits an availability indicator to the serving cell. Specifically, the terminal transmits an RRC message such as an RRCSetupComplete message or an RRCResumeComplete message including an availability indicator to a serving cell.

In operation 721, the terminal receives a message for requesting MDT data loaded from one of the serving cells. That is, the terminal receives a message requesting to transmit data related to the measurement result of the loaded MDT stored in the terminal to the serving cell.

In operation 723, the terminal reports the measurement result to the serving cell. The terminal may directly transmit the logged MDT data initiated by the SN to the SN. Alternatively, the terminal may report the measurement result to the MN by including the logged MDT data initiated by the SN in a separate container.

Figure 8:
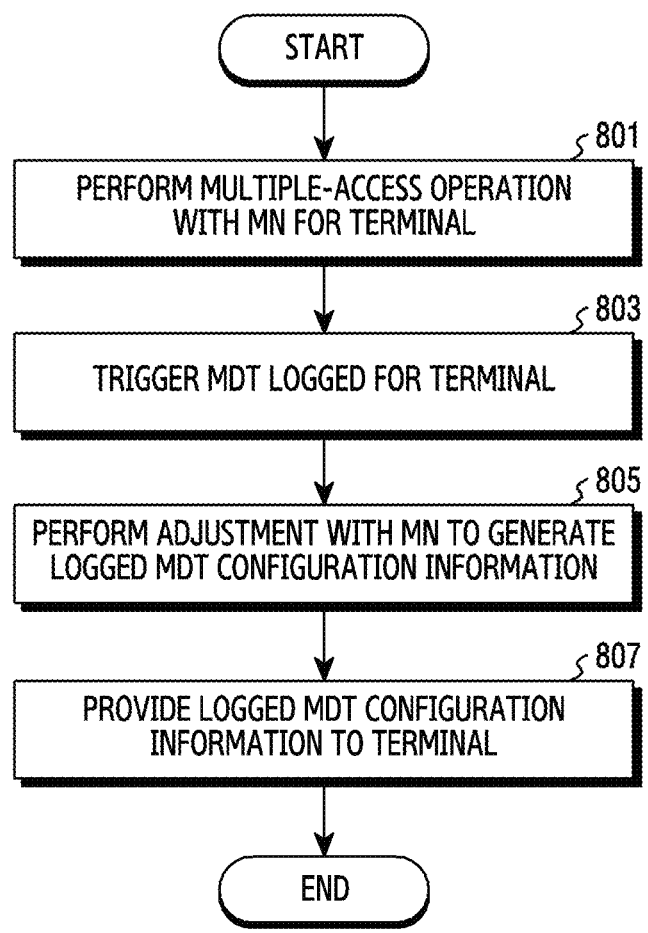
FIG. 8 is a flowchart of a SN (secondary node) for configuring idle mode measurement information in a multiple-access state in a wireless communication system according to various embodiments.

FIG. 8 is a flowchart of a secondary node (SN) for configuring idle mode measurement information in a multiple-access state in a wireless communication system according to various embodiments.

In operation 801, the SN performs a multiple-access operation with the MN for the terminal. Specifically, the SN serves a terminal switched to the multiple-access state through a predetermined coordination procedure with the MN.

In operation 803, the SN triggers the MDT logged for the terminal.

In operation 805, the SN performs an adjustment procedure with the MN to generate logged MDT configuration information.

In operation 807, the SN provides logged MDT configuration information to the terminal. Specifically, when the SRB is configured between the SN and the terminal, the SN can directly transmit the logged MDT configuration information to the terminal. When the SRB is not configured between the SN and the terminal, the SN delivers the logged MDT configuration information to the terminal through the MN. In this case, a separate container for the logged MDT configuration information may be defined.

Figure 9:
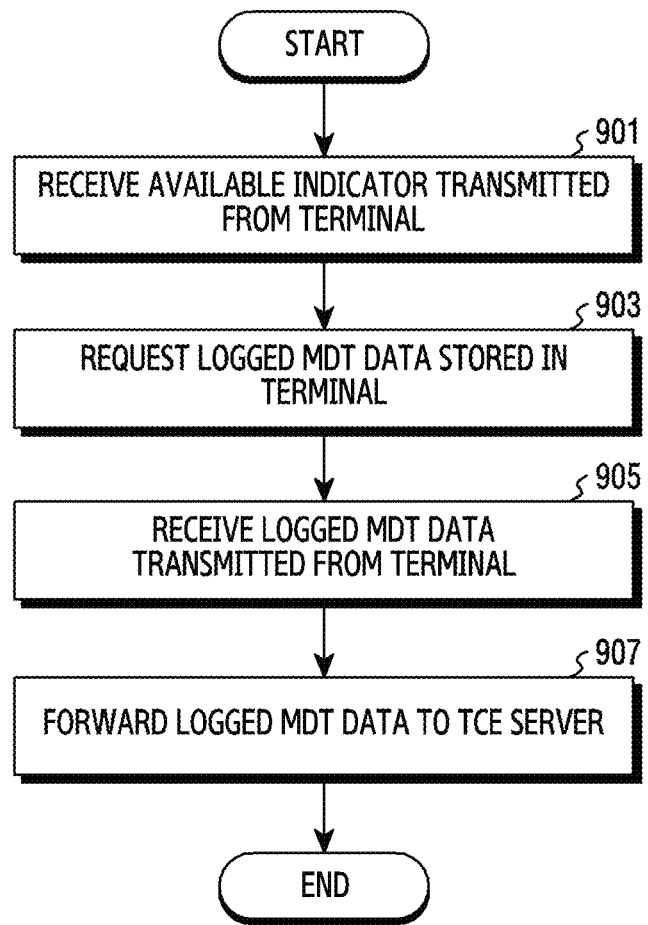
FIG. 9 is a flowchart of an SN for collecting idle mode measurement results in a multiple-access state in a wireless communication system according to various embodiments.

FIG. 9 is a flowchart of an SN for collecting idle mode measurement results in a multiple-access state in a wireless communication system according to various embodiments.

In operation 901, the SN receives an availability indicator transmitted from the terminal. The SN may receive an RRC message such as an RRCSetupComplete message or an RRCResumeComplete message including an availability indicator, either directly from the terminal or through an MN. Whether the availability indicator is directly received may be determined based on whether an SRB is established between the SN and the terminal. The availability indicator indicates that the terminal contains the measurement result recorded through the logged MDT operation.

In operation 903, the SN requests the terminal to log the MDT data stored in the terminal. The SN may request data on the measured result of the logged MDT to the terminal through the MN, or may directly request the same from the terminal.

In operation 905, the SN receives the logged MDT data transmitted from the terminal. Specifically, when the SRB between the SN and the terminal is configured, the SN may receive the MDT data logged directly from the terminal. When the SRB between the SN and the terminal is not configured, the SN may receive the logged MDT data transmitted from the terminal through the MN.

In operation 907, the SN delivers the logged MDT data to the TCE server. When the SRB between the SN and the terminal is configured, the SN can directly receive the MDT data logged from the terminal and transmit the same to the TCE server. If the SRB between the SN and the terminal is not configured, the SN may receive the MDT data logged from the MN and deliver the same to the TCE server.

Figure 10:
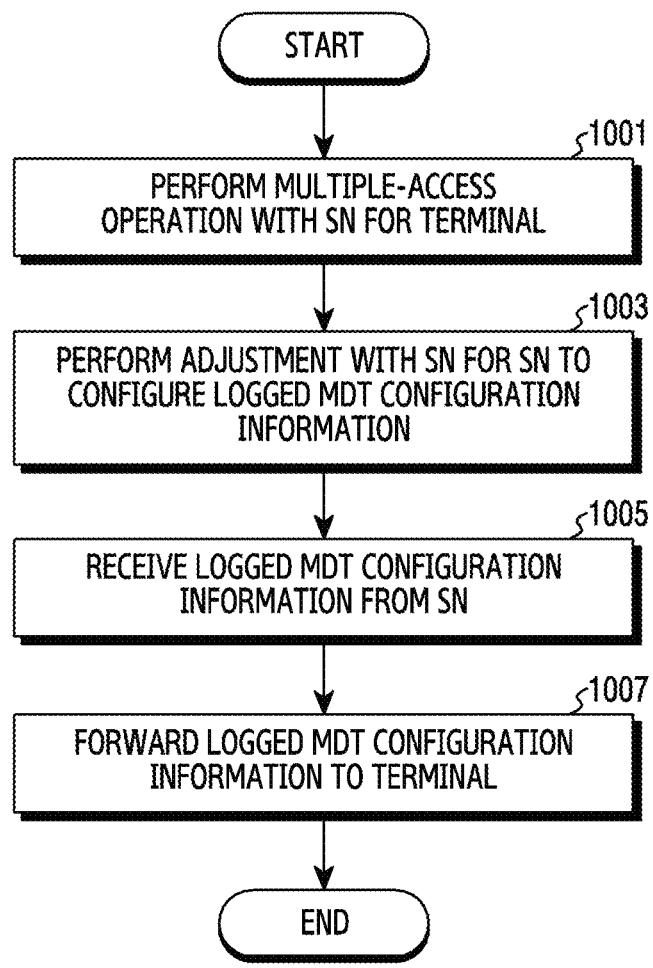
FIG. 10 is a flowchart of a master node (MN) for configuring idle mode measurement information in a multiple-access state in a wireless communication system according to various embodiments.

FIG. 10 is a flowchart of a master node (MN) for configuring idle mode measurement information in a multiple-access state in a wireless communication system according to various embodiments.

In operation 1001, the MN performs multiple-access operation with the SN for the terminal. Specifically, the MN services the terminal switched to the multiple-access state through a predetermined coordination procedure with the SN.

In operation 1003, the MN performs a predetermined adjustment procedure with the SN so that the SN configures the logged MDT configuration information.

In operation 1005, the MN receives the MDT configuration information logged from the SN. If the SRB for sending and receiving RRC messages between the SN and the terminal is not configured, the SN cannot directly send the MDT configuration information logged to the terminal, so the MN may receive the MDT configuration information to be provided to the terminal from the SN.

In operation 1007, the MN delivers the logged MDT configuration information to the terminal. Because there is no SRB configured between the SN and the terminal, the MN may forward the logged MDT configuration information configured by the SN to the terminal.

Figure 11:
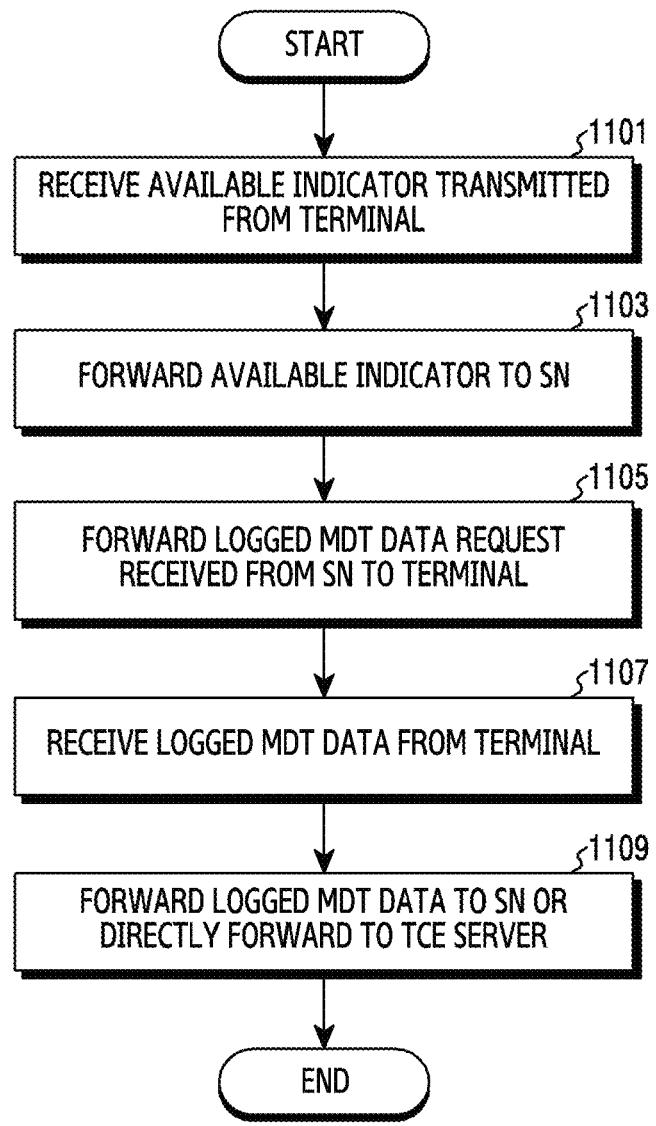
FIG. 11 is a flowchart of an MN for collecting idle mode measurement results in a multiple-access state in a wireless communication system according to various embodiments.

FIG. 11 is a flowchart of an MN for collecting idle mode measurement results in a multiple-access state in a wireless communication system according to various embodiments.

In operation 1101, the MN receives an availability indicator from the terminal. The MN may receive an RRC message, such as an RRCSetupComplete message or an RRCResumeComplete message, including an availability indicator, from the terminal. The availability indicator indicates that the terminal holds the measurement result recorded through the logged MDT operation.

In operation 1103, the MN forwards the received availability indicator to the SN. Specifically, the MN delivers the availability indicator to the SN if it is identified that the received indicator corresponds to the logged MDT initiated by the SN.

In operation 1105, the MN delivers the logged MDT data request received from the SN to the terminal. In this case, since there is no SRB configured between the SN and the terminal, a message for requesting the measurement result from the terminal may be transmitted through the MN.

In operation 1107, the MN receives logged MDT data from the terminal. Specifically, the MN may receive data indicating a measurement result according to the logged MDT operation performed by the terminal.

In operation 1109, the MN forwards the logged MDT data to the SN, or directly to the TCE server. Specifically, the MN may directly deliver the logged MDT data to the TCE server or to the SN according to the SN's prior notification or prior consultation with the SN. That is, when the SN cannot transmit the logged MDT data to the TCE server, the MN may directly send the logged MDT data to the TCE server.

Figure 12:
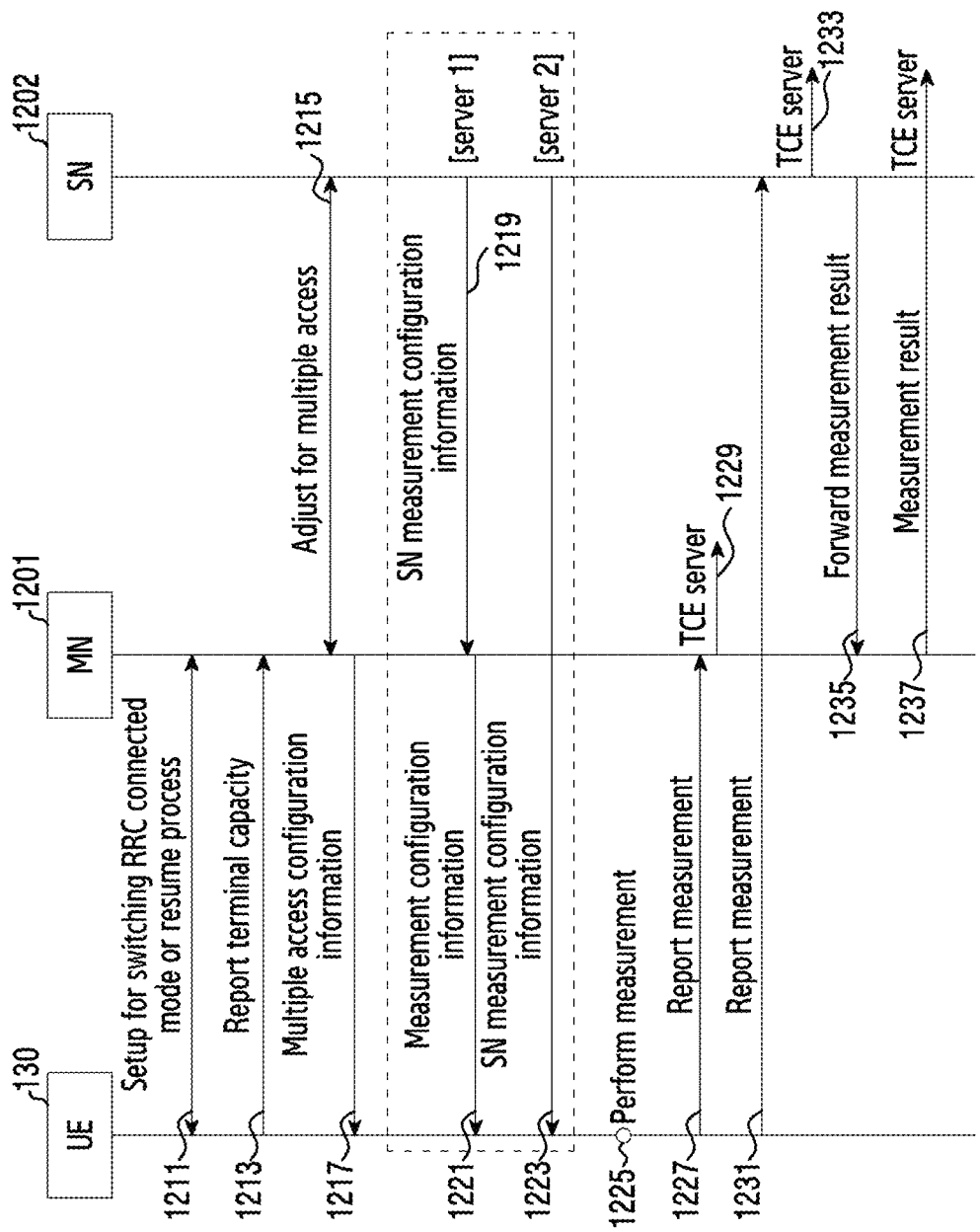
FIG. 12 is a signal exchange diagram for collecting and reporting connection-mode measurement information in a multiple-access state in a wireless communication system according to various embodiments.

FIG. 12 is a signal exchange diagram for collecting and reporting connection-mode measurement information in a multiple-access state in a wireless communication system according to various embodiments.

Referring to FIG. 12, in operation 1211, the terminal 130 in the idle mode or the inactive mode switches to the connected mode through a configuration procedure or a resume procedure.

In operation 1213, the terminal reports terminal capability information to the MN 1201. The capability information includes at least one of information on whether the terminal supports multiple-access wireless technology, information on frequency bands supporting multiple access and a combination of frequency bands, and information on whether the terminal supports logged MDT and immediate MDT.

In operation 1215, if it is determined that the MN needs to configure the multiple-access wireless technology, the terminal provides the SN 1202 with terminal capability information, MN-related configuration information, cell measurement result information, and related SN-triggered cell measurement configuration information (e.g., the number of frequency layers allowed in cell measurement triggered by the SN). In this case, the SN transmits configuration information related to the SN for supporting the terminal to the MN.

In operation 1217, the MN forwards the configuration information received from the SN to the terminal. The terminal is switched to a multiple-access state, in which services are provided by the two base stations.

The SN can configure the immediate MDT to the terminal. The SN determines whether or not to trigger immediate MDT through mutual coordination with the MN and configures immediate MDT configuration information. In the mutual coordination procedure with the MN, the SN provides the MN with information on whether the SN is connected to the TCE server, whether the SN itself can transmit the collected immediate MDT measurement result to the TCE server, whether the MN can transmit the immediate MDT measurement result to the collected TCE server, or whether any node of the MN and the SN will transmit the collected immediate MDT measurement result to the TCE server. When the SN configures the immediate MDT configuration information, the number of frequency layers allowed for the SN should not be exceeded. The MDT configuration information of the SN may be rejected by the MN.

If an SRB capable of directly transmitting an RRC message between the SN and the terminal is configured, in operation 1223, the SN directly transmits the MDT configuration information to the terminal (Option 2). For example, if SRB3 is configured between SN and terminal in EN-DC, the SN directly transmits the MDT configuration information to the terminal.

If the SRB is not established between the SN and the terminal, in operation 1219, the SN transmits the immediate MDT configuration information to the MN (Option 1). In this case, a separate container for immediate MDT configuration information may be defined. The SN may provide the MN with information on whether the SN is connected to the TCE server, whether the SN itself can transmit the immediate MDT measurement result to the TCE server, whether the MN can transmit the collected immediate MDT measurement to the TCE server, or whether any node of the MN and SN will transmit the collected immediate MDT measurement result to the TCE server.

In operation 1221, the MN forwards the MDT configuration information to the terminal using a predetermined RRC message. For example, a loggedMeasurementConfiguration message can be forwarded the terminal.

In operation 1225, the terminal receiving the immediate MDT configuration information performs a cell measurement operation according to the immediate MDT configuration information.

In operation 1227, the terminal reports the measurement result to the MN that provided the immediate MDT configuration information.

If the SN cannot transmit the measurement result to the TCE server, in operation 1229, the cell measurement result collected by the MDT configuration information triggered by the SN and reported to the MN is transmitted to the TCE server by the MN. If the SN transmits the measurement result to a TCE server, the MN may forward the cell measurement result to the SN.

If an SRB capable of directly transmitting an RRC message between the SN and the terminal is configured, in operation 1231, the cell measurement result collected by the immediate MDT configuration information triggered by the SN and reported to the MN is reported from the terminal to the SN.

If there is a connection between the SN and the TCE server, in operation 1233, the SN transmits the measurement result received from the terminal to the TCE server.

If there is no connection between the SN and the TCE server, in operation 1235, the SN forwards the cell measurement result to the MN, and in operation 1237, the MN delivers the cell measurement result to the TCE server.

Figure 13:
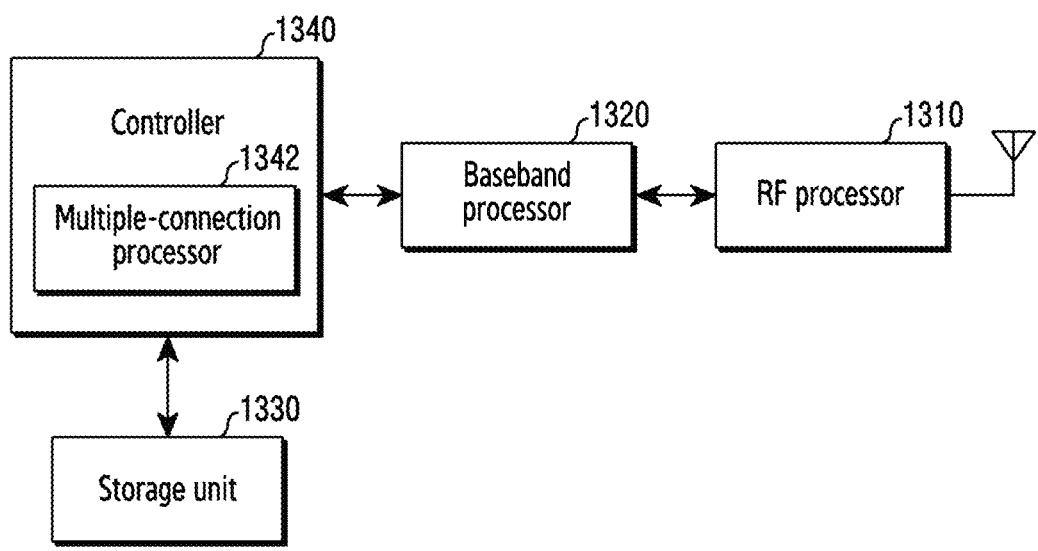
FIG. 13 illustrates the configuration of a terminal in a wireless communication system according to various embodiments.

FIG. 13 illustrates the configuration of a terminal in a wireless communication system according to various embodiments. The configuration illustrated in FIG. 13 may be understood as the configuration of the terminal 130. Hereinafter, terms such as " . . . unit," " . . . part" or the like used below mean units for processing at least one function or operation, which may be implemented by hardware or software, or a combination of hardware and software.

Referring to FIG. 13, the terminal includes a radio-frequency (RF) processor 1310, a baseband processor 1320, a storage unit 1330, and a controller 1340.

The RF processor 1310 performs functions for transmitting and receiving signals via a wireless channel, such as band conversion and amplification of the signal. That is, the RF processor 1310 upconverts the baseband signal provided from the baseband processor 1320 to an RF band signal, transmits the same through an antenna, and downconverts the RF band signal received through the antenna to a baseband signal. For example, the RF processor 1310 may include a transmission filter, a reception filter, an amplifier, a mixer, an oscillator, a digital-to-analog convertor (DAC), an analog-to-digital convertor (ADC), or the like. In the figure, only one antenna is shown, but the terminal may have multiple antennas. In addition, the RF processor 1310 may include a plurality of RF chains. Furthermore, the RF processor 1310 may perform beamforming. For the beamforming, the RF processor 1310 may adjust the phase and magnitude of each of signals transmitted and received through a plurality of antennas or antenna elements. In addition, the RF processor 1310 may perform multiple-input multiple-output (MIMO) operation and receive multiple layers when performing MIMO operation.

The baseband processor 1320 performs a function of conversion between a baseband signal and a bit stream according to the physical-layer standard of the system. For example, during data transmission, the baseband processor 1320 generates complex symbols by encoding and modulating a transmission bit stream. In addition, when receiving data, the baseband processor 1320 restores the received bit stream through demodulation and decoding of the baseband signal provided from the RF processor 1310. For example, in the case of conforming to an orthogonal frequency-division multiplexing (OFDM) method, when transmitting data, the baseband processor 1320 generates complex symbols by encoding and modulating a transmission bit string, maps the complex symbols to subcarriers, and then configures OFDM symbols through an inverse fast Fourier transform (IFFT) operation and cyclic prefix (CP) insertion. In addition, when receiving data, the baseband processor 1320 divides the baseband signal provided from the RF processor 1310 into OFDM symbol units, restores signals mapped to subcarriers through a fast Fourier transform (FFT) operation, and restores the received bit stream through demodulation and decoding.

The baseband processor 1320 and the RF processor 1310 transmit and receive signals as described above. Accordingly, each of the baseband processor 1320 and the RF processor 1310 may be referred to as a transmitter, a receiver, a transceiver, or a communication unit. Furthermore, at least one of the baseband processor 1320 and the RF processor 1310 may include a plurality of communication modules to support a plurality of different wireless access technologies. Also, at least one of the baseband processor 1320 and the RF processor 1310 may include different communication modules to process signals in different frequency bands. For example, the different wireless access technologies may include a wireless LAN (e.g., IEEE 802.11), a cellular network (e.g., LTE), and the like. In addition, the different frequency bands may include a super-high-frequency (SHF) band (e.g., 2.NRHz) and a millimeter-wave (e.g., 60 GHz) band.

The storage unit 1330 stores data such as a basic program, an application, and configuration information for the operation of the terminal. In particular, the storage unit 1330 may store information related to a second access node performing wireless communication using a second radio access technology. Then, the storage unit 1330 provides stored data in response to the request from the controller 1340.

The controller 1340 controls the overall operation of the terminal. For example, the controller 1340 transmits and receives signals through the baseband processing unit 1320 and the RF processor 1310. In addition, the controller 1340 writes and reads data in the storage unit 1330. To this end, the controller 1340 may include at least one processor. For example, the controller 1340 may include a communication processor (CP) that performs control for communication and an application processor (AP) that controls an upper layer such as an application.

According to various embodiments, the controller 1340 may include a multiple-connection processor 1342. As described above, the multiple-connection processor 1342 may perform a function of controlling the terminal to perform overall procedures related to immediate MDT or logged MDT in the multiple-connection state.

Figure 14:
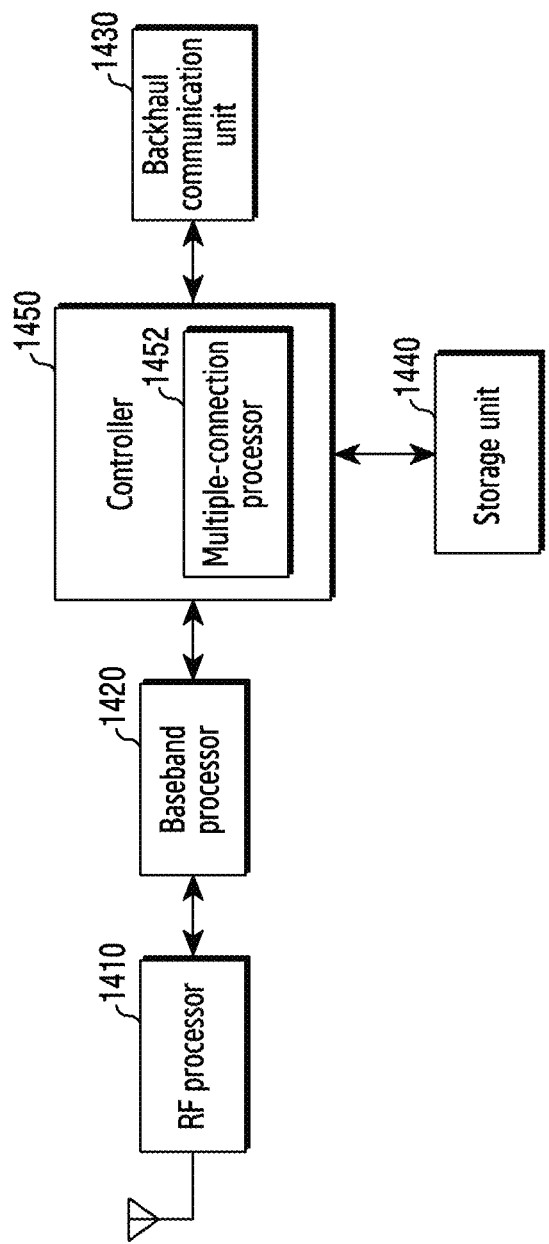
FIG. 14 illustrates the configuration of a base station in a wireless communication system according to various embodiments.

FIG. 14 illustrates the configuration of a base station in a wireless communication system according to various embodiments. The configuration illustrated in FIG. 14 may be understood as the configuration of at least one of the gNB 110 or the eNB 120. Hereinafter, terms such as " . . . unit," " . . . part" or the like used below mean a unit that processes at least one function or operation, which may be implemented by hardware or software, or a combination of hardware and software.

Referring to FIG. 14, the base station includes an RF processor 1410, a baseband processor 1420, a backhaul communication unit 1430, a storage unit 1440, and a controller 1450.

The RF processor 1410 performs functions for transmitting and receiving signals via a wireless channel, such as band conversion, amplification, or the like. That is, the RF processor 1410 upconverts the baseband signal provided from the baseband processor 1420 to a radio-frequency (RF) band signal, transmits the same through an antenna, and downconverts the RF band signal received through the antenna to a baseband signal. For example, the RF processor 1410 may include a transmission filter, a reception filter, an amplifier, a mixer, an oscillator, a DAC, an ADC, or the like. In the figure, only one antenna is shown, but the first access node may have multiple antennas. In addition, the RF processor 1410 may include a plurality of RF chains. Furthermore, the RF processor 1410 may perform beamforming. For the beamforming, the RF processor 1410 may adjust the phase and magnitude of each of signals transmitted and received through a plurality of antennas or antenna elements. The RF processor 1410 may perform downlink MIMO operation by transmitting more than one layer.

The baseband processor 1420 performs a function of conversion between a baseband signal and a bit stream according to the physical-layer standard of the first wireless access technology. For example, when transmitting data, the baseband processor 1420 generates complex symbols by encoding and modulating a transmission bit stream. In addition, when receiving data, the baseband processor 1420 restores the received bit stream through demodulation and decoding of the baseband signal provided from the RF processor 1410. For example, in the case of conforming to an OFDM method, when transmitting data, the baseband processor 1420 generates complex symbols by encoding and modulating a transmission bit string, maps the complex symbols to subcarriers, and then configures OFDM symbols through the IFFT operation and CP insertion. In addition, when receiving data, the baseband processor 1420 divides the baseband signal provided from the RF processor 1410 into OFDM symbol units, restores signals mapped to subcarriers through the FFT operation, and restores the received bit stream through demodulation and decoding. The baseband processor 1420 and the RF processor 1410 transmit and receive signals as described above. Accordingly, each of the baseband processor 1420 and the RF processor 1410 may be referred to as a transmitter, a receiver, a transceiver, a communication unit, or a wireless communication unit.

The backhaul communication unit 1430 provides an interface for communicating with other nodes in the network. That is, the backhaul communication unit 1430 converts the bit stream transmitted from the main base station to another node, for example, an auxiliary base station, a core network, or the like, into a physical signal, and converts the physical signal received from another node into a bit stream.

The storage unit 1440 stores data such as a basic program, an application, and configuration information for the operation of the main base station. In particular, the storage unit 1440 may store information about bearers allocated to the connected terminal, measurement results reported from the connected terminal, and the like. In addition, the storage unit 1440 may store information serving as a reference for determining whether to provide or stop multiple connections to the terminal. Then, the storage unit 1440 provides data stored at the request of the controller 1450.

The controller 1450 controls the overall operation of the main base station. For example, the controller 1450 transmits and receives signals through the baseband processor 1420 and the RF processor 1410 or through the backhaul communication unit 1430. In addition, the controller 1450 writes and reads data in the storage unit 1440. To this end, the controller 1450 may include at least one processor.

According to various embodiments, the controller 1450 may include a multiple-connection processor 1452. As described above, the multiple-connection processor 1452 may perform a function of controlling the terminal to perform overall procedures related to immediate MDT or logged MDT in the multiple-connection state.

Figure 15:
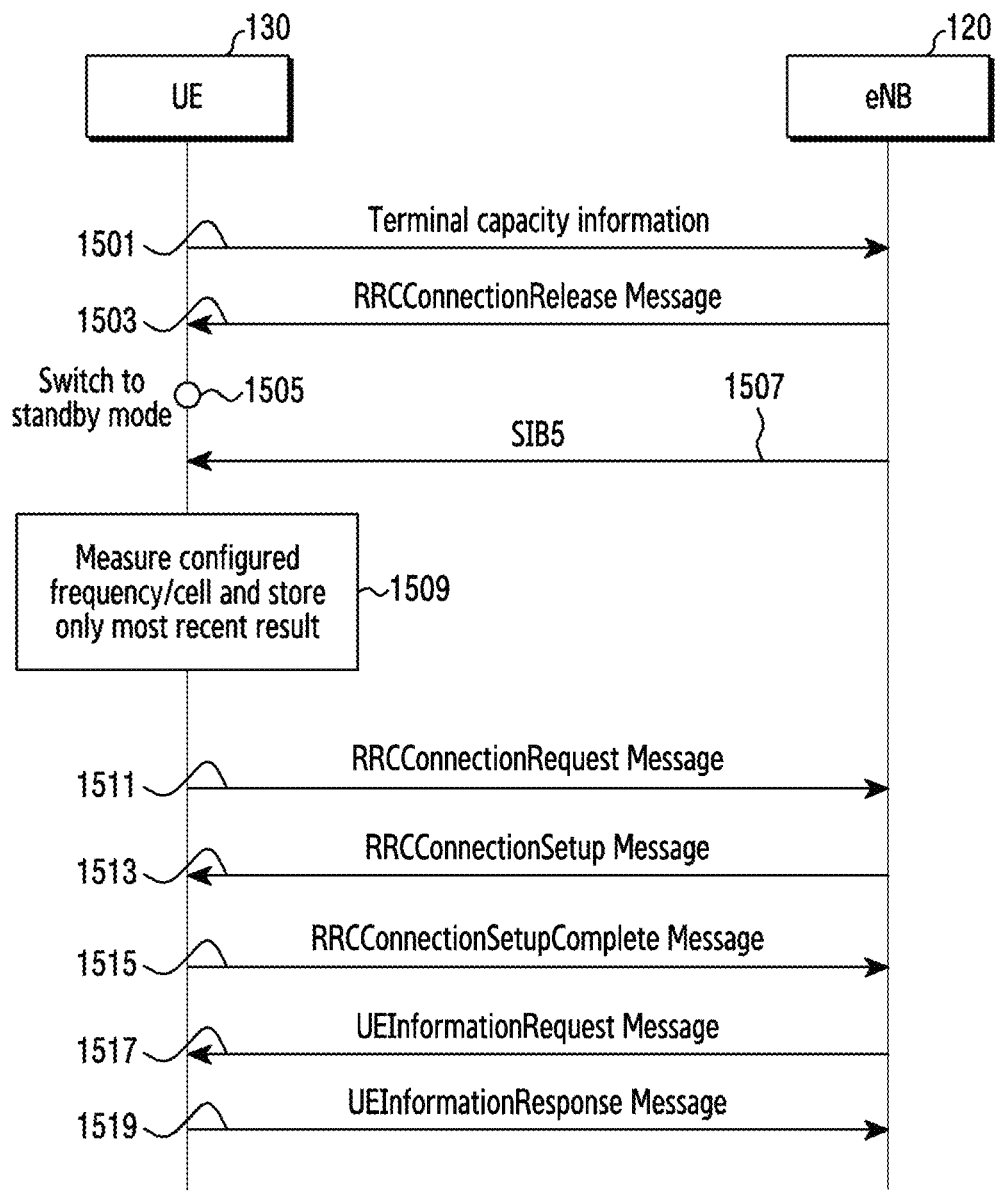
FIG. 15 is a flowchart illustrating an operation of performing idle mode measurement in LTE technology according to various embodiments.

FIG. 15 is a flowchart illustrating an operation of performing idle mode measurement in LTE technology according to various embodiments.

A base station 120 may configure additional serving cells (an SCell, PSCell, PUCCH SCell, etc.) to a terminal 130 by using CA or DC technology to increase the maximum data rate of the terminal 130. In order to configure serving cells, measurement of a corresponding frequency may be performed beforehand. Therefore, a predetermined process may be required in order to additionally configure serving cells. For example, in order to configure additional serving cells to the terminal 130 switched from the idle mode to the connected mode, the base station 120 may first provide the terminal 130 with measurement configurations for the concerned frequency. The terminal 130 performing the measurement operation based on the measurement configuration for the concerned frequency may report the measurement result to the base station 120. The base station 120 may configure appropriate serving cells for the terminal 130 based on the measurement result. Due to this procedure, it may take some time to configure new serving cells.

Idle mode measurement is an LTE technology in which the terminal 130 reports the measurement result in the idle mode to the base station 120 so that the base station 120 can quickly configure the serving cell.

The terminal 130 may report the terminal capability information to the base station 120 (1501). The capability information may include an indicator indicating whether the terminal 130 supports idle mode measurement.

The base station 120 may provide the terminal 130 with idle mode measurement configuration information (measIdleConfigIE) using an RRCConnectionRelease message (1503). The idle mode measurement configuration information may include the frequency information to be measured by the terminal 130, the measurement bandwidth for each frequency, the cell list for performing idle mode measurement for each frequency (validityArea field), the cell list for measurement and reporting for each frequency, the measurement quantity (RSRP, RSRQ) for each frequency, the channel quality threshold values for which reporting is allowed (cells that do not exceed the threshold value need not be reported), and time interval information for performing idle mode measurement. The time interval information for performing idle mode measurement may be used as a T331 timer value.

The T331 timer may be started when an RRCConnectionRelease message including idle mode measurement configuration information is received, and may be stopped when an RRCConnectionSetup or RRCConnectionResume message is received or when a cell not belonging to validityArea is reselected. When the T331 timer expires, idle mode measurement configuration information may be released.

Upon receiving RRCConnectionRelease, the terminal 130 may be switched from the connected mode to the idle mode (1505). Idle mode measurement configuration information may be provided as dedicated RRC signaling as well as system information (1507).

If the terminal 130 has received the idle mode measurement configuration information through dedicated RRC signaling, the idle mode measurement configuration information provided as system information may be ignored. However, if the terminal 130 receives idle mode measurement configuration information including only time interval information for performing idle mode measurement through dedicated RRC signaling, the terminal 130 may perform the idle mode measurement operation by applying the idle mode measurement configuration information provided as system information. At this time, the idle mode measurement operation may be performed only when the T331 timer is running.

The terminal 130 may measure the frequency and cell configured according to the provided idle mode measurement configuration information, and may store only the most recent result (1509).

The terminal 130 may transmit an RRCConnectionRequest message to the base station 120 to switch to the connected mode (1511). The base station 120 may transmit an RRCConnectionSetup message to the terminal 130 (1513). The terminal 130 may transmit an RRCConnectionSetupComplete message including an indicator indicating that the terminal is storing the idle mode measurement result to the base station 120 (1515).

The base station 120 may request the stored result using the UEInformationRequest message (1517). The terminal 130 may report the stored result to the base station 120 using the UEInformationResponse message (1519).

In the next-generation mobile communication system, NR, early measurement is being studied with a technique similar to idle mode measurement. The early measurement operation can be performed in an inactive mode as well as an idle mode. In general, the frequency or cell measurement result configured in the idle mode measurement can also be used for MDT purposes. Accordingly, according to the disclosure, for MDT purposes, the terminal may periodically store the measurement result of the RAT (heterogeneous system), frequency, or cell configured in early measurement. Additional configuration information for periodically storing the result of measurement of the cell may be provided to the terminal, and the result of measurement of the cell may be periodically reported to the base station separately from the latest cell measurement result. In the disclosure, an early measurement operation of storing and reporting only the latest cell measurement results is referred to as a first early measurement operation, and an early measurement operation that periodically stores and reports measurement results is referred to as a second early measurement operation. The second early measurement operation can be performed only when both the first early measurement and logged MDT are configured. This is for the purpose of MDT only, to exclude the early measurement operation. In general, in MDT technology, it is possible to minimize additional terminal operations for MDT purposes only. According to various embodiments, the MDT principle of storing only measurement results collected through existing operations is consistent therewith.

Figure 16:
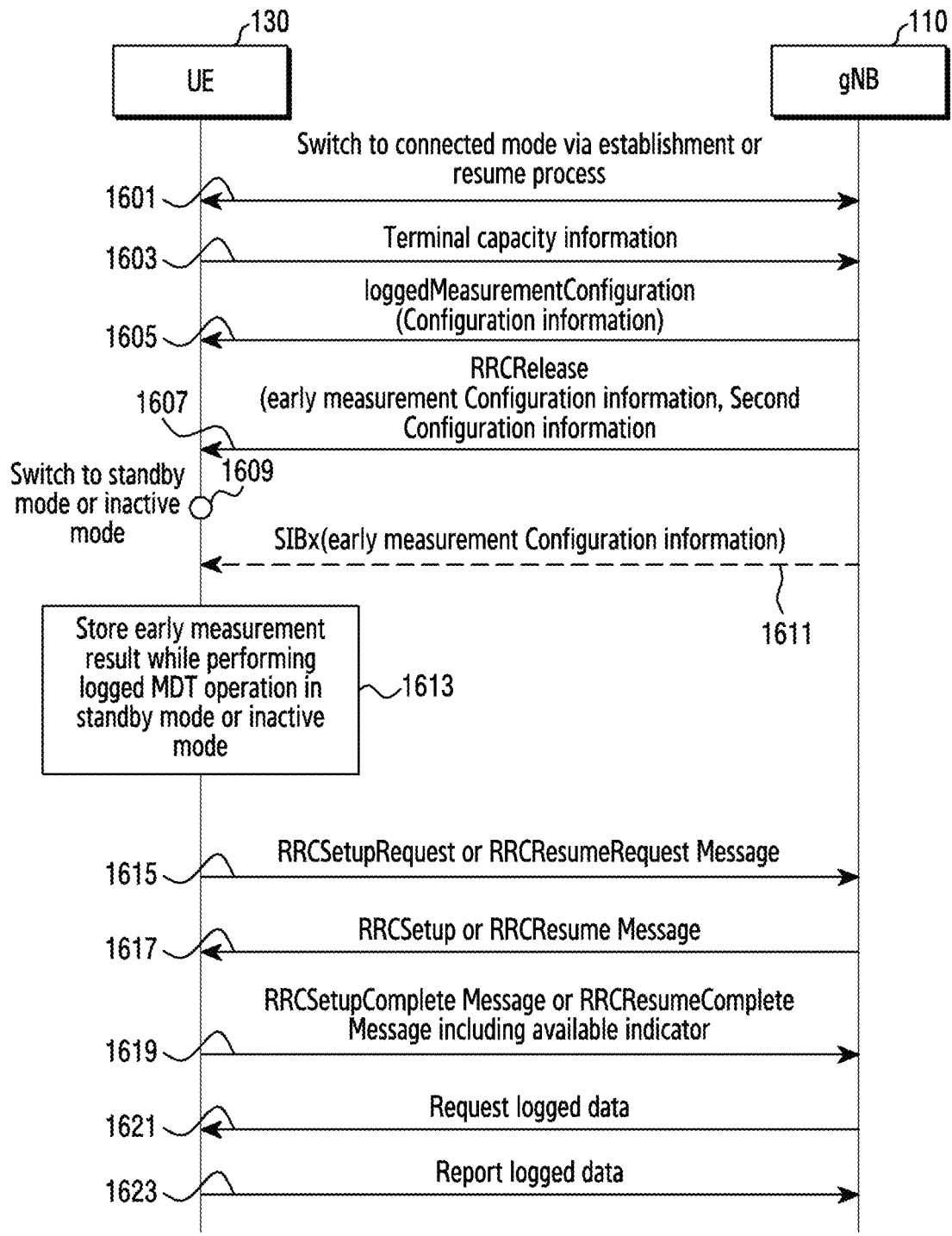
FIG. 16 is a flowchart illustrating an operation of performing early measurement according to various embodiments.

FIG. 16 is a flowchart illustrating an operation of performing early measurement according to various embodiments.

A terminal 130 may switch to a connected mode through an establishment or resume process (1601).

The terminal 130 may report the capability information of the terminal to the base station 110 (1603). The capability information may include an indicator indicating whether the terminal supports logged MDT or early measurement.

A base station 110 may include the first configuration information in a predetermined RRC message, loggedMeasurementConfiguration, and may provide the same to the terminal 130 (1605). The first configuration information is configuration information required to perform the Logged MDT operation, and is described in operation 505. The first configuration information may be included in the RRCRelease message.

The base station 110 may include the early measurement configuration information and the second configuration information in a predetermined RRC message RRCRelease to be provided to the terminal 130 (1607). The RRCRelease message may be an RRC message transmitted from the base station 110 when the terminal 130 is switched to an idle mode or an inactive mode. The early measurement configuration information is the above-described idle mode measurement configuration information, and may further include RAT information to be measured and SMTC configuration information of cells to be measured. The terminal 130 receiving the early measurement configuration information may drive the T331 timer. The second configuration information may be configuration information necessary to periodically store measurement results collected through the early measurement operation when the early measurement operation is performed. The second configuration information may be provided as a new IE, which is part of the early measurement configuration information. The second configuration information may include period information and time interval information for storing measurement results collected through an early measurement operation. The time period information may be replaced with a time period driven by the T331 timer. The second configuration information may be configured when the first configuration information and early measurement configuration information are provided to the terminal 130. If neither the first configuration information nor the early measurement configuration information is provided, the second configuration information may not be provided. In the operation according to the second configuration information, that is, the second early measurement operation, traceReference, traceRecordingSessionRef, absoluteTimeInfo, and TCE ID information provided in the first configuration information may be applied, and information provided in the first configuration information might not need to be provided separately in the second configuration information. Also, information provided in the first configuration information may be included in the second early measurement reporting information. In addition to RRCRelease, the second configuration information may be included in another RRC message, for example, a loggedMeasurementConfiguration message including the first configuration information.

The second configuration information may not be provided separately. For example, the first configuration information may be recycled as configuration information for the second early measurement operation. At this time, the first configuration information may include a new indicator that triggers the second early measurement operation and indicates that the first configuration information is also applied to the second early measurement operation.

When receiving the RRCRelease message, the terminal 130 may switch to the idle mode or the inactive mode (1609).

The base station 110 may provide early measurement configuration information through system information (1611). The early measurement configuration information is for a first early measurement operation, and configuration information for a second early measurement operation may be additionally included. If the early measurement configuration information provided through dedicated RRC signaling includes only the T331 timer information value, the terminal 130 may perform the first and second early measurement operations by applying the provided early measurement configuration information through system information.

The terminal 130 in the idle mode or the inactive mode may perform a logged MDT operation, a first early measurement operation, and a second early measurement operation, based on the received early measurement configuration information (1613).

The logged MDT operation is an operation of periodically storing the measured cell measurement result for cell reselection. Cell- and frequency-related configuration information to be measured is provided as system information, and configuration information related to periodic storage and reporting may be first configuration information provided through dedicated RRC signaling. In the first early measurement operation, the cell, frequency, and RAT indicated in the early measurement configuration information are measured, and only the most recent result is stored. In the second early measurement operation, the cell, frequency, and RAT indicated in the early measurement configuration information are measured, and a periodic storage and reporting operation may be performed according to the second configuration information.

The logged MDT operation and the logging duration for storing the measurement result in the second early measurement operation may be the same or different. If the time interval for storing the measurement result in the logged MDT operation and the time interval for storing the second early measurement operation are the same, the logging duration value (T330) included in the first configuration information may be applied. If different values are applied as the time interval for storing the measurement result in the logged MDT operation and the second early measurement operation, the logging duration value included in the first configuration information is applied in the logged MDT operation, and a separate logging duration value indicated in the configuration information may be applied, or a T331 timer value included in the early measurement configuration information may be applied in the second early measurement operation. In addition, according to another embodiment, the second early measurement operation may be performed only in a time interval in which a time interval according to a logging duration included in the first configuration information and a T331-timer-driving time interval included in the early measurement configuration information overlap. The result stored according to the second early measurement operation may be deleted after a predetermined time (e.g., 48 hours) after the T331 or T330 timer expires.

Information stored periodically via the second early measurement operation is as follows.

Measured frequency information
Measured cell ID, PCI
The number of cells to be measured may be preconfigured or predetermined. Only cells exceeding the configured cell quality may be stored.
Cell quality information, RSRP and RSRQ
Relative time information (compared to absolute time information)
Terminal location information In addition to the periodically stored information described above, traceReference, traceRecordingSessionRef, absoluteTimeInfo, and TCE ID information may be reported at the request of the base station 110.

Measurement results stored according to the logged MDT operation, the first early measurement operation, and the second early measurement operation may be stored in different logging entries (a type of container). Storing the measurement results in different logging entries (types of container) enables the stored information to be easily separated and reported according to type when measurement results are subsequently reported to the base station. The base station 110 may first request reporting in order of preference or priority. If measurement results for LTE and NR systems are stored according to the second early measurement operation, the measurement results may be stored in separate logging entries for each RAT.

The terminal 130 may transmit an RRCSetupRequest or RRCResumeRequest message to the base station 110 to switch to the connected mode (1615).

The base station 110 may transmit an RRCSetup or RRCResume message to the terminal 130 (1617).

The terminal 130 may transmit an RRCSetupComplete or RRCResumeComplete message including predetermined availability indicators to the base station 110 (1619). The availability indicator may be used to indicate that the terminal 130 stores cell measurement results. The availability indicator may be provided separately for the logged MDT, first early measurement, and second early measurement. In addition, the availability indicator for the second early measurement may be provided for each stored RAT. For example, if measurement results for LTE and NR systems are stored according to the second early measurement, an availability indicator may exist for each RAT.

If there is one availability indicator requesting all of the storage results without the above-described classification, the terminal 130 receiving one availability indicator may report all of the measurement results stored according to all operations in response to the request from the base station 110.

The base station 110 may request measurement information stored in the terminal 130 using a predetermined RRC message (1621).

The base station 110 may request separate reporting of the measurement results stored according to the logged MDT operation, the first early measurement operation, and the second early measurement operation, or may request a full report. When requesting separate reporting, a separate indicator indicating the same may be included in a predetermined RRC message. In addition, when the measurement result is stored according to the second early measurement operation, the base station 110 may request the measurement result stored for each RAT, and for this purpose, an indicator corresponding to each RAT may be included in a predetermined RRC message. There may be a separate indicator for requesting all stored measurement results according to the above-described operations.

The terminal 130 may report measurement information stored in the terminal 130 using a predetermined RRC message according to a request for a measurement result (1623). The terminal 130 may report the measurement information corresponding to the indicator requesting the measurement result to the base station 110.

Figure 17:
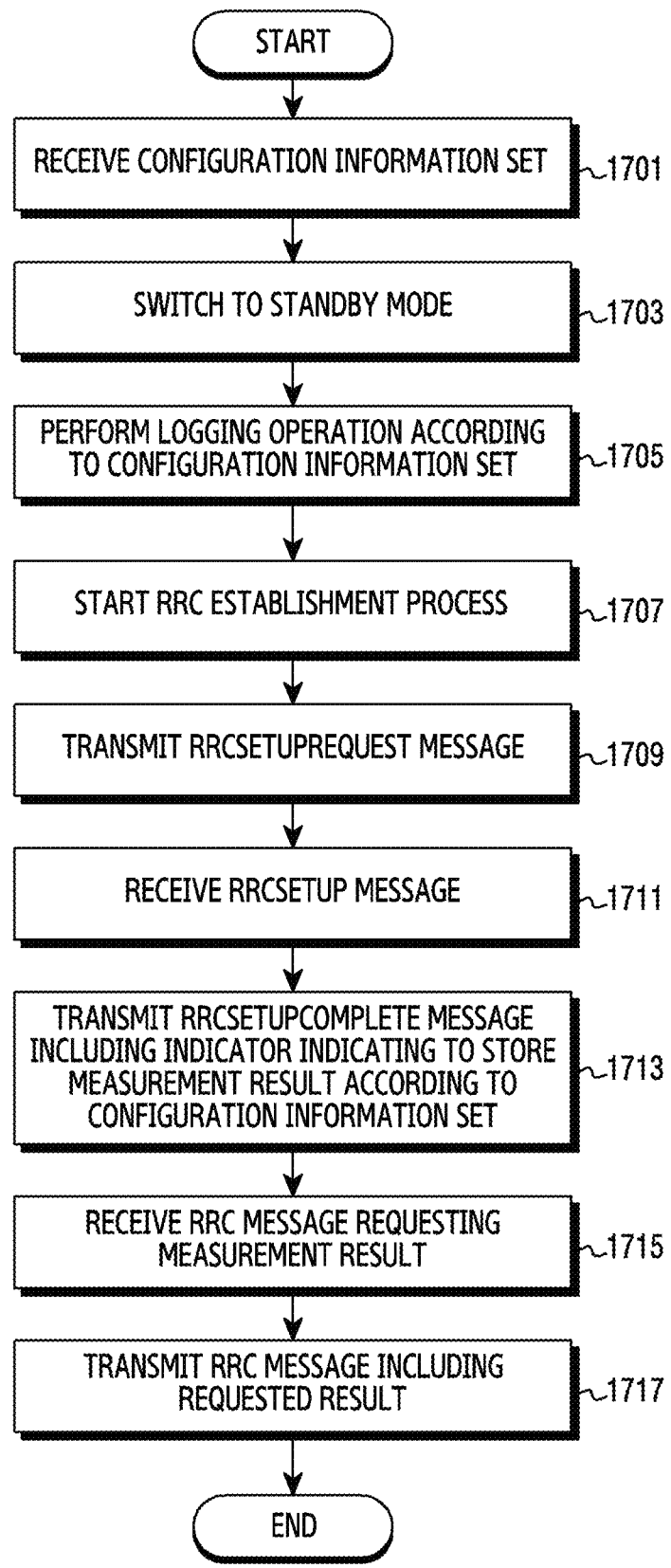
FIG. 17 is a flowchart illustrating an operation of a terminal performing early measurement according to various embodiments.

FIG. 17 is a flowchart illustrating an operation of a terminal performing early measurement according to various embodiments.

Referring to FIG. 17, a process in which a terminal configured with an early measurement operation according to various embodiments is switched from an idle mode to a connected mode is illustrated.

In operation 1701, the connected mode terminal may receive first configuration information, second configuration information, and early measurement configuration information from the base station.

In operation 1703, the terminal may switch to the idle mode.

In operation 1705, the terminal may periodically store the measurement result according to the configuration information. The logged MDT operation according to the first configuration information, the first early measurement operation according to the early measurement configuration information, and the second early measurement operation according to the early measurement configuration information and the second configuration information (or reuse of the first configuration information) may be performed, and the measurement results may be stored.

In operation 1707, the terminal may trigger the establishment process to switch to the connected mode.

In operation 1709, the terminal may transmit an RRCSetupRequest message to the base station.

In operation 1711, the terminal may receive an RRC Setup message from the base station.

In operation 1713, the terminal may transmit an RRCSetupComplete message to the base station. The RRC message may include an indicator indicating that the terminal stores a predetermined measurement result. The availability indicator may be used to indicate that the terminal stores cell measurement results. The availability indicator may be provided separately for the logged MDT, first early measurement, or second early measurement. In addition, the availability indicator for the second early measurement may be provided for each stored RAT. For example, if measurement results for LTE and NR systems are stored according to the second early measurement, an availability indicator may exist for each RAT.

In operation 1715, the terminal may be requested to report the measurement result through a predetermined message from the base station. The base station may request separate reporting of the measurement results stored according to the logged MDT operation, the first early measurement operation, or the second early measurement operation, or may request reporting of all thereof. When the base station requests separate measurement results, a separate indicator indicating the same may be stored in a predetermined RRC message. In addition, in the case of a measurement result stored according to the second early measurement operation, the base station may request the measurement result stored for each RAT, and for this, an indicator corresponding to each RAT may be stored in a predetermined RRC message. There may be a separate indicator that requests stored measurement results according to all operations.

In operation 1717, the terminal may report the requested result to the base station using a predetermined message.

Figure 18:
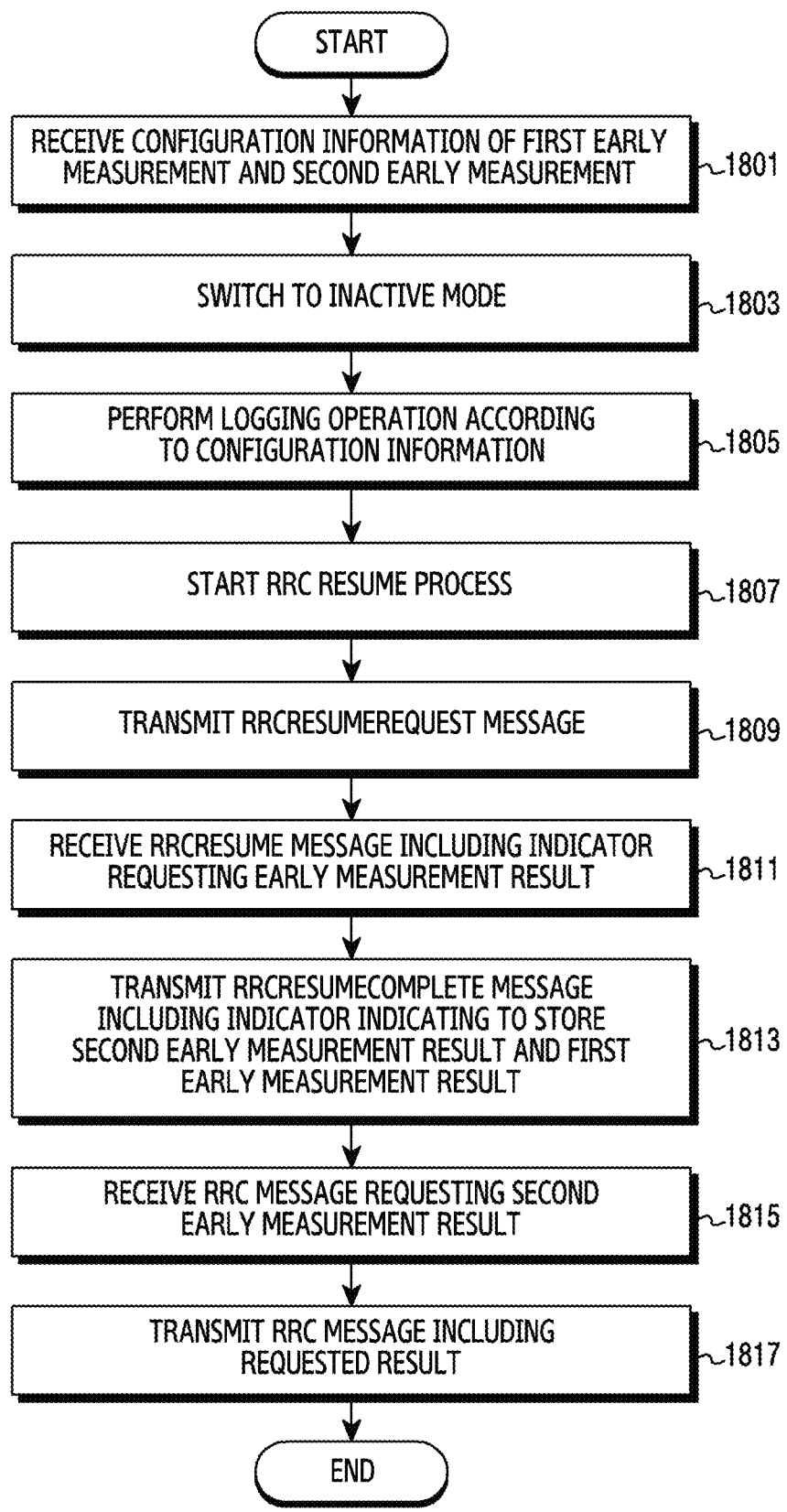
FIG. 18 is a flowchart illustrating an operation of a terminal performing early measurement according to various embodiments.

FIG. 18 is a flowchart illustrating an operation of a terminal performing early measurement according to various embodiments.

Referring to FIG. 18, a process in which a terminal configured with an early measurement operation according to various embodiments is switched from an inactive mode to a connected mode is illustrated.

In operation 1801, the connected mode terminal may receive first configuration information, second configuration information, and early measurement configuration information from the base station.

In operation 1803, the terminal may switch to the inactive mode.

In operation 1805, the terminal may periodically store the measurement result according to the configuration information. By performing a logged MDT operation according to the first configuration information, a first early measurement operation according to the early measurement configuration information, and a second early measurement operation according to the early measurement configuration information and the second configuration information (or reuse of the first configuration information), the measurement results may be stored.

In operation 1807, the terminal may trigger the resume process to switch to the connected mode.

In operation 1809, the terminal may transmit an RRCResumeRequest message to the base station.

In operation 1811, the terminal may receive an RRCResume message from the base station. When the terminal is switched from the inactive mode to the connected mode, since AS security is activated, information stored in the RRCResumeComplete message can be transmitted. Accordingly, the base station may request the terminal to report the measurement information stored through the RRCResume message. The base station may request separate reporting of the measurement results stored according to the logged MDT operation, the first early measurement operation, and the second early measurement operation, or may request the entire report. When the base station requests separate measurement results, a separate indicator indicating the same may be stored in a predetermined RRC message. In addition, in the case of a measurement result stored according to the second early measurement operation, the base station may request the measurement result stored for each RAT, and for this, an indicator corresponding to each RAT may be stored in a predetermined RRC message. There may be a separate indicator for requesting all stored measurement results according to the above-described operations. At this time, since the availability indicator is not provided from the terminal in advance, if there is no measurement result stored for the corresponding indicator, it may not be necessary to report. Alternatively, the terminal may report an indicator indicating that there is no stored result.

In general, since the terminal periodically stores measurement results according to the logged MDT operation and the second early measurement operation, the size of the measurement result may be large. Therefore, it may be inefficient for the terminal to transmit the stored measurement result according to the logged MDT operation and the second early measurement operations through the RRCResumeComplete message. Therefore, that the base station requests a report through the RRCResume message and the terminal reports the storage result through the RRCResumeComplete message can be limited to only the result according to the first early measurement operation.

In operation 1813, the terminal may transmit an RRCResumeComplete message to the base station. The RRC message may include an indicator indicating that the terminal stores a predetermined measurement result. The availability indicator may be used to indicate that there is a cell measurement result stored by the terminal itself. The availability indicator may be provided separately for the logged MDT, first early measurement, and second early measurement. In addition, the availability indicator for the second early measurement may be provided for each stored RAT. For example, if measurement results for LTE and NR systems are stored according to the second early measurement, an availability indicator may exist for each RAT.

If a report request is made through the RRCResume message, the terminal may store the corresponding storage result in the RRCResumeComplete message and report the same to the base station.

In operation 1815, the terminal may be requested to report the result through a predetermined message from the base station.

In operation 1817, the terminal may report the result to the base station using a predetermined message.

Figure 19:
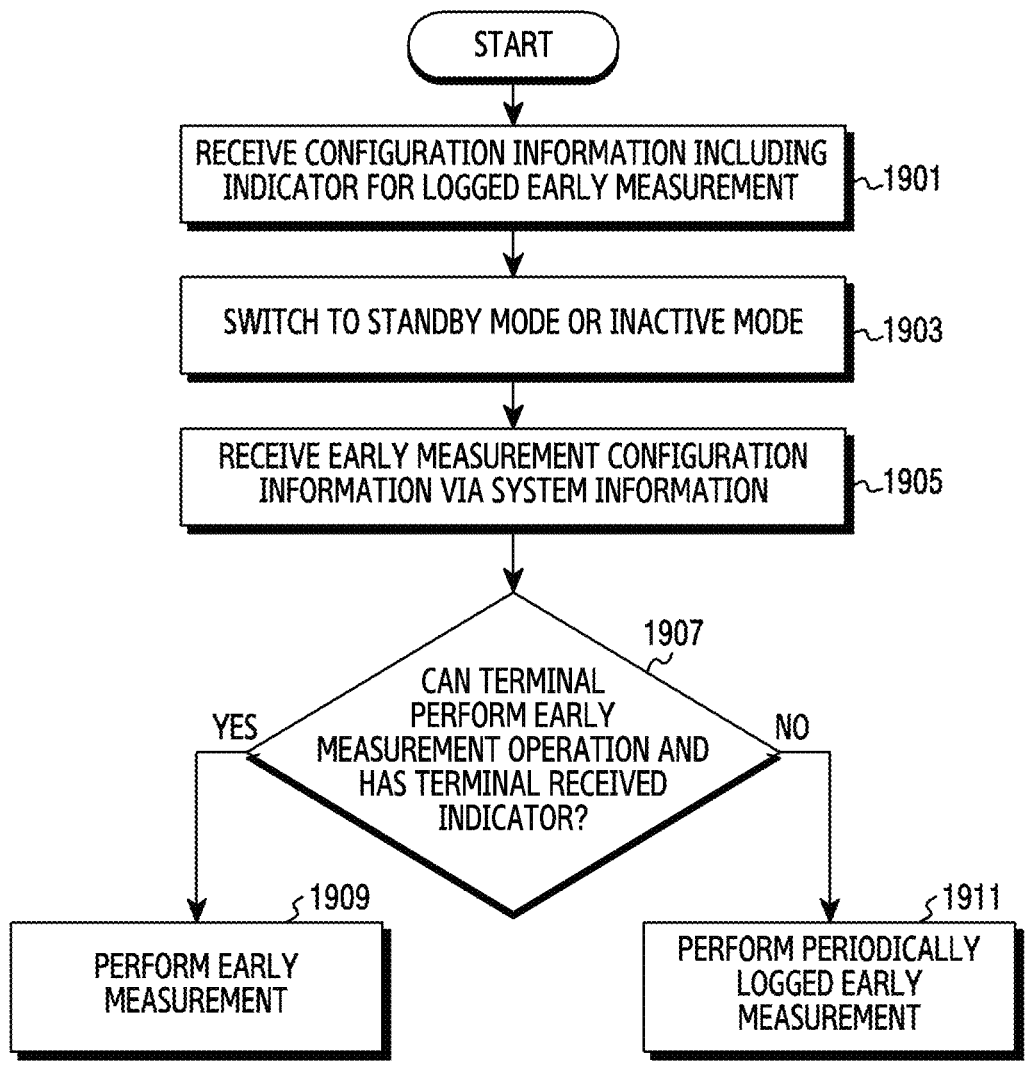
FIG. 19 is a flowchart illustrating an operation of a terminal performing early measurement according to various embodiments.

FIG. 19 is a flowchart illustrating an operation of a terminal performing early measurement according to various embodiments.

Referring to FIG. 19, a process whereby the terminal that receives early measurement configuration information through system information according to various embodiments performs an early measurement operation is illustrated.

In operation 1901, the terminal may apply the early measurement configuration information provided through the system information, and may receive configuration information, including an indicator indicating that the second early measurement is performed, from the base station through a predetermined RRC message. The predetermined RRC message may be a loggedMeasurementConfiguration or an RRCRelease message. The terminal may be provided with early measurement configuration information including at least a T331 timer value.

In operation 1903, the terminal may switch to an idle mode or an inactive mode.

In operation 1905, the terminal may receive early measurement configuration information through system information.

In operation 1907, the terminal may determine whether an indicator indicating that the second early measurement operation is performed is received.

In operation 1909, when the terminal can perform an early measurement operation and receives an indicator indicating that the second early measurement operation is performed, the terminal may perform the first early measurement and the second early measurement operation by applying the early measurement configuration information provided through the system information.

In operation 1911, if the terminal cannot perform an early measurement operation or has not received an indicator indicating that the second early measurement operation is performed, the terminal may perform the first early measurement operation by applying the early measurement configuration information provided via the system information.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the disclosure, the terms "computer program product" or "computer-readable medium" are used to refer to a medium such as memory, a hard disk installed in a hard disk drive, and a signal. These "computer program products" or "computer-readable recording media" are means to provide a software computer system composed of instructions that configure the length of a timer for receiving missing data packets based on network metrics corresponding to the determined event according to the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a secondary node (SN) in a wireless communication system, the method comprising:
   receiving, from a master node (MN), configuration information for an immediate minimization of drive test (MDT);
   transmitting, to a terminal, the configuration information; and
   receiving, from the terminal, an immediate MDT measurement result,
   wherein the terminal is in a radio resource control (RRC) connected mode when the MDT measurement result is measured,
   wherein a first radio access technology (RAT) of the MN is different from a second RAT of the SN, and
   wherein the terminal communicates with the MN and the SN.

2. The method of claim 1,
   wherein the immediate MDT measurement result received from the terminal is received through the MN.

3. The method of claim 1, further comprising forwarding the immediate MDT measurement result to a master node (MN) in order to transmit the immediate MDT measurement result received from the terminal to a trace collection entity (TCE) server.

4. The method of claim 1, further comprising transmitting the immediate MDT measurement result received from the terminal to a trace collection entity (TCE) server.

5. A method performed by a terminal in a wireless communication system, the method comprising:
   receiving, from a secondary node (SN), configuration information for an immediate minimization of drive test (MDT); and
   transmitting, to the SN, an immediate MDT measurement result,
   wherein the terminal is in a radio resource control (RRC) connected mode when the immediate MDT measurement result is measured,
   wherein a first radio access technology (RAT) of a master node (MN) is different from a second RAT of the SN, and
   wherein the terminal communicates with the MN and the SN.

6. The method of claim 5, wherein the configuration information for the immediate MDT received from the SN is received through a master node (MN), and
   wherein the immediate MDT measurement result is transmitted to the SN through the MN.

7. A secondary node (SN) in a wireless communication system, the SN comprising:
   a transceiver; and
   at least one processor operably coupled to the transceiver,
   wherein the at least one processor is configured to:
      receive, from a master node (MN), configuration information for an immediate minimization of drive test (MDT),
      transmit, to a terminal, the configuration information, and
      receive, from the terminal, an immediate MDT measurement result,
   wherein the terminal is in a radio resource control (RRC) connected mode when the immediate MDT measurement result is measured,
   wherein a first radio access technology (RAT) of the MN is different from a second RAT of the SN,
   wherein the terminal communicates with the MN and the SN.

8. The SN of claim 7, wherein the at least one processor is further configured to:
   transmit the configuration information for the immediate MDT to the terminal through a master node (MN), and
   receive the immediate MDT measurement result received from the terminal through the MN.

9. The SN of claim 7, wherein the at least one processor is further configured to:
   forward the immediate MDT measurement result to a master node (MN) in order to transmit the immediate MDT measurement result received from the terminal to a trace collection entity (TCE) server.

10. The SN of claim 7, wherein the at least one processor is further configured to:
    transmit the immediate MDT measurement result received from the terminal to a trace collection entity (TCE) server.

11. A terminal in a wireless communication system, the terminal comprising:
    a transceiver; and
    at least one processor operably coupled to the transceiver,
    wherein the at least one processor is configured to:
       receive, from a secondary node (SN) configuration information for an immediate minimization of drive test (MDT), and
       transmit, to the SN, an immediate MDT measurement result,
    wherein the terminal is in a radio resource control (RRC) connected mode when the immediate MDT measurement result is measured,
    wherein a first radio technology (RAT) of a master node (MN) is different from a second RAT of the SN, and
    wherein the terminal communicates with the MN and the SN.

12. The terminal of claim 11, wherein the at least one processor is further configured to:

receive the configuration information for the immediate MDT received from the SN through a master node (MN), and transmit the immediate MDT measurement result to the SN through the MN.

* * * * *